United States Patent
Nagano et al.

(10) Patent No.: US 9,243,139 B2
(45) Date of Patent: Jan. 26, 2016

(54) EPOXY RESIN COMPOSITION, PREPREG AND FIBER-REINFORCED COMPOSITE MATERIAL

(71) Applicant: TORAY INDUSTRIES, INC., Chuo-ku, Tokyo (JP)

(72) Inventors: Maki Nagano, Nagoya (JP); Nobuyuki Tomioka, Nagoya (JP); Takayuki Imaoka, Ehime (JP); Shiro Honda, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 76 days.

(21) Appl. No.: 14/104,586

(22) Filed: Dec. 12, 2013

(65) Prior Publication Data

US 2014/0100320 A1    Apr. 10, 2014

Related U.S. Application Data

(62) Division of application No. 13/121,358, filed as application No. PCT/JP2009/066877 on Sep. 29, 2009, now Pat. No. 8,658,736.

(30) Foreign Application Priority Data

Sep. 29, 2008  (JP) ................. 2008-249840
Mar. 26, 2009  (JP) ................. 2009-075888

(51) Int. Cl.

| B32B 27/04 | (2006.01) |
| B32B 27/38 | (2006.01) |
| C08L 63/00 | (2006.01) |
| C08L 63/02 | (2006.01) |
| C08G 59/42 | (2006.01) |
| C08G 59/50 | (2006.01) |
| C08G 59/68 | (2006.01) |
| C08J 5/24 | (2006.01) |
| C08L 53/02 | (2006.01) |

(52) U.S. Cl.
CPC ............... *C08L 63/00* (2013.01); *B32B 27/04* (2013.01); *B32B 27/38* (2013.01); *C08G 59/4238* (2013.01); *C08G 59/50* (2013.01); *C08G 59/686* (2013.01); *C08J 5/24* (2013.01); *C08J 2363/00* (2013.01); *C08L 53/02* (2013.01); *Y10T 428/24994* (2015.04); *Y10T 428/24995* (2015.04)

(58) Field of Classification Search
None
See application file for complete search history.

(56) References Cited

U.S. PATENT DOCUMENTS

| 5,258,426 A | 11/1993 | Uchida et al. |
| 6,399,199 B1 | 6/2002 | Fujino et al. |
| 8,278,389 B2 | 10/2012 | Tomioka et al. |
| 8,309,631 B2 | 11/2012 | Tomioka et al. |
| 2004/0034124 A1 | 2/2004 | Court et al. |
| 2009/0098335 A1 | 4/2009 | Kousaka et al. |
| 2009/0198012 A1 | 8/2009 | Sakata et al. |
| 2010/0209642 A1 | 8/2010 | Tomioka et al. |

FOREIGN PATENT DOCUMENTS

| EP | 1 142 920 A1 | | 10/2001 |
| EP | 1 454 936 A1 | | 9/2004 |
| JP | 2-222441 A | | 9/1990 |
| JP | 11-171974 A | | 6/1999 |
| JP | 11-171974 A | * | 6/1999 |
| JP | 2003-535181 A | | 11/2003 |
| JP | 2006-104403 A | * | 4/2006 |
| JP | 2006-219513 A | * | 8/2006 |
| JP | 2007-154160 A | * | 6/2007 |
| JP | 2007-154160 A | | 6/2007 |
| JP | 2007-314753 A | | 12/2007 |
| JP | 2008-7682 A | | 1/2008 |
| JP | 2008-7682 A | * | 1/2008 |
| JP | 2008-31193 A | | 2/2008 |
| JP | 2008-31193 A | * | 2/2008 |
| JP | 2008-189794 A | * | 8/2008 |
| JP | 2008-189794 A | | 8/2008 |
| JP | 2009-108144 A | | 5/2009 |
| WO | WO 2006/077153 A2 | | 7/2006 |
| WO | WO 2008/001705 A1 | | 1/2008 |
| WO | WO 2008/143044 A1 | | 11/2008 |
| WO | WO 2009/107697 A1 | | 9/2009 |

OTHER PUBLICATIONS

International Search Report, dated Nov. 24, 2009, issued in PCT/JP2009/066877.
Japanese Notification of Reasons for Refusal, drafted Sep. 3, 2012, for Japanese Application No. 2009-216684, including English translation.
Search Report dated May 6, 2015 for European Application No. 15151497.3.

* cited by examiner

*Primary Examiner* — Robert Sellers

(74) *Attorney, Agent, or Firm* — Birch Stewart Kolasch & Birch, LLP

(57) ABSTRACT

An epoxy resin composition comprising an epoxy resin [A], an amine-based curing agent [B] and a block copolymer [C] as components, wherein the epoxy resin [A] contains [Aa] an epoxy resin having at least one structure selected from a condensed polycyclic structure, biphenyl structure and oxazolidone ring structure; [Ab] an epoxy resin selected from a polyfunctional amine type epoxy resin [Ab1] and a liquid bisphenol type epoxy resin [Ab2], and the block copolymer [C] is at least one block copolymer selected from the group consisting of S-B-M, B-M and M-B-M. The present invention provides an epoxy resin composition that can be cured to form a cured product excellent in heat resistance, elastic modulus and toughness.

7 Claims, No Drawings

EPOXY RESIN COMPOSITION, PREPREG AND FIBER-REINFORCED COMPOSITE MATERIAL

CROSS REFERENCE

The present application is a 37 C.F.R. §1.53(b) divisional of, and claims priority to, U.S. application Ser. No. 13/121,358, filed Mar. 28, 2011, (U.S. Pat. No. 8,658,736, issued Feb. 25, 2014). Application Ser. No. 13/121,358 is the national phase under 35 U.S.C. §371 of International Application No. PCT/JP2009/066877, filed on Sep. 29, 2009. Priority is also claimed to Japanese Application No. 2008-249840 filed on Sep. 29, 2008 and Japanese Application No. 2009-075888 filed on Mar. 26, 2009. The entire contents of each of these applications is hereby incorporated by reference.

TECHNICAL FIELD

The present invention relates to an epoxy resin composition used as a matrix resin of a fiber-reinforced composite material suitable for sports applications, aerospace application and general industrial applications.

BACKGROUND ART

In recent years, fiber-reinforced composite materials using reinforcing fibers such as carbon fibers and aramid fibers have been used as structural materials of aircraft and motor vehicles, and for sports applications as tennis rackets, golf shafts and fishing rods, general industrial applications and the like owing to the high specific strength and specific elastic modulus thereof. Methods for producing fiber-reinforced composite materials include a method of using a prepreg as an intermediate sheet-like material in which reinforcing fibers are impregnated with an uncured matrix resin, laminating multiple plies of the prepreg and subsequently heating for curing, and a resin transfer molding method of pouring a liquid resin into the reinforcing fibers disposed in a mold and subsequently heating the resin for curing.

Among these production methods, the method of using a prepreg has an advantage that a fiber-reinforced composite material with high performance can be easily obtained for such reasons that the orientation of reinforcing fibers can be strictly controlled and that the degree of freedom in designing a laminate configuration is high. As the matrix resins used in the prepregs, thermosetting resins are mainly used in view of heat resistance and productivity, among them, epoxy resins are suitably used in view of. the adhesiveness between the resin and the reinforcing fibers, dimensional stability, and mechanical properties such as strength and stiffness of the composite material obtained.

Hitherto as methods for enhancing the toughness of an epoxy resin, for example, methods of mixing a rubber ingredient or thermoplastic resin excellent in toughness for forming a phase-separated structure together with an epoxy resin have been tried. However, these methods have such problems as the decline elastic modulus or heat resistance, the deterioration of processability due to viscosity rise and the decline of appearance quality due to void formation, etc. For example, a method for greatly enhancing the toughness by adding large amounts of a phenoxy resin and polyethersulfone, to cause phase separation thereof is proposed (Patent Document 1). However, since the mixing of a thermoplastic resin exerts large influence of viscosity rise, the processability tends to deteriorate. Especially in the case where the epoxy resin composition is used for producing the prepregs for the primary structural materials of aircraft, the mixed amount of the thermoplastic resin must be decreased to avoid the adverse effect on processability, and there is a trend of being unable to make the epoxy resin sufficiently tough.

On the contrary, in recent years, methods of enhancing the toughness and impact resistance by using a diblock or triblock copolymer for forming a nanosized phase-separated structure can be seen. For example, Patent Documents 2 to 5 propose methods of enhancing the toughness by using a styrene-butadiene copolymer, styrene-butadiene-methacrylic acid copolymer or butadiene-methacrylic acid copolymer in combination with a specific epoxy resin. However, the cured resins obtained by these methods are insufficient in the heat resistance and elastic modulus for aircraft applications.

For enhancing the toughness, a technique of adjusting the component ratio of an epoxy resin composition and controlling the phase-separated structure of a block copolymer, to thereby enhance the toughness is proposed (Patent Document 6). Further, a technique of using an amine type epoxy resin with a high crosslinking degree so as to obtain an epoxy resin composition with a high elastic modulus, high heat resistance and high toughness is proposed (Patent Document 7). These techniques are especially effective for applications such as golf shafts requiring both torsion strength and impact resistance. On the other hand, for applications such as bicycle frames and bats requiring higher impact resistance, the impact resistance of the composite materials tends to be insufficient. Moreover, the use for aircraft applications requiring high heat resistance has been difficult.

Patent Document 1: JP 2007-314753 A
Patent Document 2: WO 2006/077153
Patent Document 3: JP 2008-527718 A
Patent Document 4: JP 2007-154160 A
Patent Document 5: JP 2008-007682 A
Patent Document 6: WO 2008/001705
Patent Document 7: WO 2008/143044

DISCLOSURE OF THE INVENTION

Problems to be Solved by the Invention

An object of this invention is to provide an epoxy resin composition that can be cured to form a cured product excellent in toughness, heat resistance and elastic modulus by improving the disadvantages of the prior art as described above.' Another object is to provide a fiber-reinforced composite material excellent in impact resistance, heat resistance and static strength properties.

Means for Solving the Problems

This invention has the following configuration for solving the abovementioned problems. An epoxy resin composition comprising an epoxy resin [A], an amine-based curing agent [B] and a block copolymer [C] as components, wherein the epoxy resin [A] contains the following [Aa] and [Ab], and the block copolymer [C] is the following block copolymer:

[Aa] an epoxy resin having at least one structure selected from a condensed polycyclic structure, biphenyl structure and oxazolidone ring structure;

[Ab] an epoxy resin selected from a polyfunctional amine type epoxy resin [Ab1] and a liquid bisphenol type epoxy resin [Ab2]; [C] at least one block copolymer selected from the group consisting of S-B-M, B-M and M-B-M;

where the aforementioned respective blocks are linked by a covalent bond or are linked by an intermediate molecule connected with one block by one covalent bond and with the other block by another covalent bond; block M is a block consisting of polymethyl methacrylate homopolymer or a copolymer containing at least 50 wt % of methyl methacrylate; block B is a block immiscible with the block M and has a glass transition temperature of 20° C. or lower; and block S is a block immiscible with the blocks B and M and has a glass transition temperature higher than the glass transition temperature of the block B.

A preferred mode of this invention is an epoxy resin composition wherein the condensed polycyclic structure of the abovementioned component [Aa] is at least one structure selected from a naphthalene structure, fluorene structure and dicyclopentadiene structure, and the component [B] is diaminodiphenylsulfone.

An another preferred mode of this invention is an epoxy resin composition wherein the abovementioned component [Aa] is a biphenyl type epoxy resin having a biphenyl structure; the component [Ab] contains the following components [Ab1'], [Ab2] and [Ab3]; and the component [B] is dicyandiamide:
[Ab1'] a glycidylaniline derivative represented by the following general formula (I):

[Chemical formula 1]

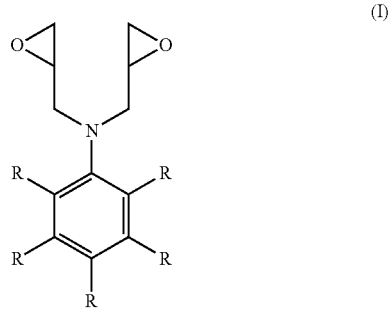

(I)

where Rs denote, respectively independently, hydrogen, straight-chain or branched alkyl with 1 to 5 carbon atoms, or straight-chain or branched alkoxy with 1 to 5 carbon atoms;
[Ab2] a liquid bisphenol type epoxy resin;
[Abs] a solid bisphenol type epoxy resin.

This invention includes a cured epoxy resin obtained by curing the abovementioned epoxy resin composition, a prepreg obtained by impregnating reinforcing fibers with the abovementioned epoxy resin composition, a fiber-reinforced composite material obtained by curing said prepreg, and a fiber-reinforced composite material comprising a cured product obtained by curing the abovementioned epoxy resin composition and a reinforcing fiber base.

Effect of the Invention

According to this invention, an epoxy resin composition that can be cured to form a cured product excellent in toughness, heat resistance and elastic modulus can be obtained. Further, if the cured epoxy resin composition and reinforcing fibers are combined, a fiber-reinforced composite material excellent in impact resistance, heat resistance and static strength properties can be obtained.

MODES FOR CARRYING OUT THE INVENTION

The present inventors found that a resin composition with high toughness, high heat resistance and high elastic modulus can be obtained by combining an epoxy resin as a specific combination of the components [Aa] and [Ab] and the component [C] described later. The detailed mechanism is not yet clarified, but the reason is estimated to be that a finely phase-separated structure can be formed owing to the influence of the difference between the polarity of the component [A] attributable to the specific mixing ratio of the components [Aa] and [Ab] and the polarity of the component [C], or the influence of the difference between the SP value of the component [A] attributable to the specific mixing ratio of the components [Aa] and [Ab] and the SP value of the component [C].

Further, in the fiber composite material, since the phase-separated structure is sufficiently small in fineness compared with the intervals between the reinforcing fibers, the linearity of the reinforcing fibers is not impaired, and high static mechanical strength and impact resistance can be obtained.

In the epoxy resin composition of this invention, it is necessary that the epoxy resin [A] contains one or more epoxy resins having at least one structure selected from a condensed polycyclic structure, bisphenyl structure and oxazolidone ring structure [Aa]. The epoxy resins allow the cured resin obtained to have very high toughness. If one or more epoxy resins selected from them are contained, the cured resin can be lowered in crosslinking density and enhanced in toughness while maintaining heat resistance.

In this description, the condensed polycyclic structure refers to a cyclic hydrocarbon in which two or more single rings share the sides thereof or a cyclic compound containing a hetero atom. The single ring can be a ring consisting of saturated bonds or can also be a ring having an unsaturated bond. An unsaturated bond is a bond selected from a carbon-carbon double bond, carbon-nitrogen double bond and carbon-carbon triple bond. Particular examples of the condensed polycyclic structure include naphthalene, fluorene, dicyclopentadiene, anthracene, xanthene, pyrene, etc.

Commercially available products of the epoxy resin having a naphthalene structure include "Epiclon (registered trademark)" HP4032, HP4032D, HP4700 and HP4770 (respectively produced by Dainippon Ink and Chemicals, Inc.), NC-7000 and NC-7300 (respectively produced by Nippon Kayaku Co., Ltd.), ESN-175 and 360 (respectively produced by Tohto Kasei Co., Ltd.), etc.

Commercially available products of the epoxy resin having a fluorene structure include "ONCOAT (registered trademark)"
EX-1010, EX-1011, EX-1012, EX-1020, EX-1030, EX-1040, EX-1050 and EX-1051 (produced by Nagase & Co., Ltd.), etc.

Commercially available products of the dicyclopentadiene type epoxy resin include "Epiclon (registered trademark)" HP7200, HP7200L and HP7200H (respectively produced by Dainippon Ink and Chemicals, Inc.), Tactix558 (produced by Huntsman Advanced Materials), XD-1000-1L and XD-1000-2L (respectively produced by Nippon Kayaku Co., Ltd.), XD-1000-1L and XD-1000-2L (respectively produced by Nippon Kayaku Co., Ltd.), etc.

Commercially available products of the epoxy resin having an anthracene structure include "jER (registered trademark)" YX8800 (produced by Japan Epoxy Resins Co., Ltd.), etc.

Commercially available products of the epoxy resin having a biphenyl structure include "jER (registered trademark)" YX4000H, YX4000, YL6616, YL6121H, YL6640 and YL6677 (respectively produced by Japan Epoxy Resins Co., Ltd.), NC3000 (produced by Nippon Kayaku Co., Ltd.), etc.

Commercially available products of the epoxy resin having an oxazolidone ring structure include AER4152 and XAC4151 (respectively produced by Asahi Kasei Epoxy Co., Ltd.), etc. Meanwhile, an epoxy resin having an oxazolidone ring structure can also be obtained by the method described, for example, in JP 2003-119253 A, etc., that is, by reacting an epoxy resin and an isocyanate compound in the presence of a catalyst. As the epoxy resin used as the raw material, a bisphenol A type epoxy resin, bisphenol F type epoxy resin, novolak type epoxy resin, further glycidyl ether type epoxy resin, amine epoxy resin, etc. can be enumerated. Furthermore, as the isocyanate compound, an aromatic or aliphatic diisocyanate compound, polyisocyanate compound, etc. can be enumerated. In this case, the polyisocyanate compound is a compound having three or more isocyanate groups. In order to exhibit high heat resistance, an aromatic diisocyanate compound or aromatic polyisocyanate is preferred. As the commercially available products of the aromatic diisocyanate compound, diphenylmethane diisocyanate and toluene diisocyanate (respectively produced by Tokyo Chemical Industry Co., Ltd.), etc. can be enumerated. As commercially available products of the aromatic polyisocyanate compound, "Millionate (registered trademark)" MR-100, MR-200, MR-300 and MR-400 (respectively produced by Nippon Polyurethane Industry Co., Ltd.), etc. can be enumerated. The catalyst used for producing an epoxy resin having an oxazolidone ring structure is not especially limited, if it is a catalyst capable of producing an oxazolidone ring structure from an epoxy group and an isocyanate group, but a quaternary ammonium salts such as tetramethylammmonium bromide, tetrabutylammonium chloride and the like can be suitably used.

In the epoxy resin composition of this invention, it is necessary that the epoxy resin [A] contains an epoxy resin selected from a polyfunctional amine type epoxy resin [Ab1] and a liquid bisphenol type epoxy resin [Ab2].

The polyfunctional amine type epoxy resin [Ab1] refers to an epoxy resin having at least one or more amino groups with at least two glycidyl groups bound thereto in the molecule. This structure gives a crosslinked structure with a high crosslinking degree in the cured product, and therefore such properties as high heat resistance and high elastic modulus can be obtained. If a block copolymer [C] is combined with it, the cured product can be enhanced in elastic modulus while maintaining heat resistance and toughness.

As the polyfunctional amine type epoxy resin, for example, tetraglycidyldiaminodiphenylmethane, triglycidylaminophenol, triglycidylaminocresol, diglycidylaniline, diglycidyltoluidine, tetraglycidylxylylenediamine, and halogen substitution products thereof, alkyl substitution products thereof, aryl substitution products thereof, aryloxy substitution products thereof, hydrogenation products thereof, etc. can be used. Among them, tetraglycidyldiaminodiphenylmethane, triglycidylaminophenol, diglycidylaniline and diglycidyltoluidine can be preferably used, since a higher elastic modulus, higher plastic deformability, higher balance of both the properties and higher toughness can be obtained.

As the commercially available products of the aforementioned tetraglycidyldiaminodiphenylmethane, "Sumiepoxy (registered trademark)" ELM434 (produced by Sumitomo Chemical Co., Ltd.), YH434L (produced by Tohto Kasei Co., Ltd.), "jER (registered trademark)" 604 (produced by Japan Epoxy Resins Co., Ltd.), "Araldite (registered trademark)" MY720 and MY721 (produced by Huntsman Advanced Materials), etc. can be used. As the commercially available products of triglycidylaminophenol or triglycidylaminocresol, "Sumiepoxy (registered trademark)" ELM100 and ELM120 (produced by Sumitomo Chemical Co., Ltd.), "Araldite (registered trademark)" MY0500, MY0510 and MY0600 (produced by Huntsman Advanced Materials), "jER (registered trademark)" 630 (produced by Japan Epoxy Resins Co., Ltd.), etc. can be used. As the commercially available products of diglycidylaniline, GAN (produced by Nippon Kayaku Co., Ltd.), etc. can be used. As commercially available products of diglycidyltoluidine, GOT (produced by Nippon Kayaku Co., Ltd.), etc. can be used. As commercially available products of tetraglycidylxylylenediamine and hydrogenation products thereof, "TETRAD (registered trademark)" -X and "TETRAD (registered trademark)" -C (produced by Mitsubishi Gas Chemical Co., Inc.), etc. can be used.

Further, it is preferred that the epoxy resin composition of this invention contains a liquid bisphenol type epoxy resin as component [Ab2], since the toughness of the cured product and the handling property of the epoxy resin composition are excellent.

As the liquid bisphenol type epoxy resin, a bisphenol A type epoxy resin and bisphenol F type epoxy resin are preferred. For example, as the bisphenol A type epoxy resin, "jER (registered trademark)" 825, 826, 827, 828, 828EL and 828XA (respectively produced by Japan Epoxy Resins Co., Ltd.), "Epotohto (registered trademark)" YD-127, YD-128, YD-128G and YD-128S (respectively produced by Tohto Kasei Co., Ltd.), "Epiclon (registered trademark)" 840, 840-S, 850, 850-S, 850-CRP and 850-LC (respectively produced by Dainippon Ink and Chemicals, Inc.), "Sumiepoxy (registered trademark)" ELA128 (produced by Sumitomo Chemical Co., Ltd.), DER331 (produced by Dow Chemical), etc. can be used. Further, as bisphenol F type, "jER (registered trademark)" 806, 806L and 807 (respectively produced by Japan Epoxy Resins Co., Ltd.), "Epotohto (registered trademark)" YDF-170 (produced by Tohto Kasei Co., Ltd.), Epiclon (registered trademark)" 830, 830-S and 835 (respectively produced by Dainippon Ink and Chemicals, Inc.), etc. can be used.

Further, to the epoxy resin composition of this invention, another epoxy resin can be added for the purpose or enhancing the handling property by adjusting the viscosity or enhancing the elastic modulus and heat resistance of the cured resin. One epoxy resin alone can be added, or multiple epoxy resins can also be added in combination. Particularly, a phenol novolak type epoxy resin, cresol novolak type epoxy resin, resorcinol type epoxy resin, phenol aralkyl type epoxy resin, triphenylmethane type epoxy resin, tetraphenylethane type epoxy resin, etc. can be enumerated. As the commercially available products of the phenol novolak type epoxy resin, "jER (registered trademark)" 152 and 154 (respectively produced by Japan Epoxy Resins Co., Ltd.), "Epiclon (registered trademark)" N-740, N-770 and N-775 (respectively produced by Dainippon Ink and Chemicals, Inc.), etc. can be enumerated.

As the commercially available products of the cresol novolak type epoxy resin, "Epiclon (registered trademark)" N-660, N-665, N-670, N-673 and N-695 (respectively produced by Dainippon Ink and Chemicals, Inc.), EOCN-1020, EOCN-1025 and EOCN-1045 (respectively produced by Nippon Kayaku Co., Ltd.), etc. can be enumerated.

As examples of the resorcinol type epoxy resin, "Denacol (registered trademark)" EX-201 (produced by Nagase ChemteX Corporation), etc. can be enumerated.

As commercially available products of the triphenylmethane type epoxy resin, "Tactix" 742 (produced by Huntsman Advanced Materials), EPPN-501H and EPPN-502H (respectively produced by Nippon Kayaku Co., Ltd.), etc. can be enumerated. As the tetraphenylethane type epoxy resin, "jER (registered trademark)" 10315 (produced by Japan Epoxy Resins Co., Ltd.), etc. can be enumerated.

The amine-based curing agent as the component [B] of this invention is a component necessary for curing the epoxy resin. The amine-based curing agent is a compound that contains a nitrogen atom in the molecule and can react with epoxy groups, for curing. As the curing agent, for example, tetramethylguanidine, imidazole, derivatives thereof, carboxylic acid hydrazides, tertiary amines, aromatic amines, aliphatic amines, dicyandiamide, derivatives thereof, etc. can be enumerated. As the imidazole derivatives, for example, 2-methylimidazole,1-benzyl-2-methylimidazole, 2-ethyl-4-methylimidazole, etc. can be enumerated. As the carboxylic acid hydrazides, adipic acid hydrazide, naphthalenecarboxylic acid hydrazide, etc. can be enumerated. As the tertiary amines, N—N-dimethylaniline, N,N-dimethylbenzylamine and 2,4,6-tris(dimethylaminomethyl)phenol, etc. can be enumerated. As the aromatic amines, 4,4'-diaminodiphenylmethane, 4,4'-diaminodiphenylsulfone,3,3'-diaminodiphenylsulfone, m-phenylenediamine etc. can be enumerated. As the aliphatic amines, diethylenetriamine, triethylenetetramine, isophoronediamine, bis(aminomethyl)norbornane, bis(4-aminocyclohexyl)methane, dimer acid esters of polyethyleneimine, etc. can be enumerated. Further, modified amines obtained by reacting a compound such as an epoxy compound, acrylonitrile, phenol and formaldehyde, or thiourea, with an amine having active hydrogen such as an aromatic amine or aliphatic amine are also included.

Furthermore, as the amine-based curing agent [B], a latent curing agent can also be preferably used, since it makes the storage stability of the resin composition excellent. A latent curing agent is a curing agent capable of exhibiting activity owing to the phase change or chemical change, etc. caused by certain stimulation such as heat or light. As the latent curing agent, an amine adduct type latent curing agent, microcapsule type latent curing agent, dicyandiamide, derivatives thereof, etc. can be enumerated. An amine adduct type latent curing agent is a product having a high molecular weight and made insoluble at the storage temperature, obtained by reacting an active ingredient such as a compound having a primary, secondary or tertiary amine or any of various imidazole derivatives react with a compound capable of reacting with those compounds. A microcapsule type latent curing agent is a product obtained by using a curing agent as a nucleus and covering the nucleus with a shell such as a high molecular substance, for example, an epoxy resin, polyurethane resin, polystyrene-based compound or polyimide, etc., or cyclodextrin, etc., to decrease the contact between the epoxy resin and the curing agent. A dicyandiamide derivative is obtained by combining dicyandiamide with any of various compounds, and a product obtained by reaction with an epoxy resin and a product obtained by reaction with a vinyl compound or acrylic compound, etc. can be enumerated.

As the commercially available products of the amine adduct type latent curing agent, "Amicure (registered. trademark)" PN-23, PN-H, PN-40, PN-50, PN-F, MY-24 and MY-H (respectively produced by Ajinomoto Fine-Techno Co., Inc.), "Adeka Hardener" (registered trademark)" EH-3293S, EH-3615S and EH-4070S (respectively produced by Adeka Corporation), etc. can be enumerated. As the commercially available products of the microcapsule type latent curing agent, "Novacure (registered trademark)" HX-3721 and HX-3722 (respectively produced by Asahi Kasei Chemicals Corporation), etc. can be enumerated. As the commercially available products of dicyandiamide, DICY-7 and DICY-15 (respectively produced by Japan Epoxy Resins Co., Ltd.), etc. can be enumerated. Any one of these amine-based curing agents can be used, or two or more of them can also be used together.

The block copolymer [C] of at least one type selected from the group consisting of S-B-M, B-M and M-B-M of (hereinafter may also be abbreviated as a block copolymer) in this invention is an essential component for enhancing the toughness and impact resistance while maintaining the excellent heat resistance of the epoxy resin composition.

In this case, the respective blocks represented by the aforementioned S, B and M is linked by a covalent bond or is linked by an intermediate molecule bonded to one block by one covalent bond and bonded to the other block by another covalent bond.

The block M is a block consisting of polymethyl methacrylate homopolymer or a copolymer containing at least 50 wt % of methyl methacrylate.

The block B is a block immiscible with the block M and has a glass transition temperature Tg (hereinafter may be referred to merely as Tg) of 20° C. or lower.

The glass transition temperature Tg of the block B can be measured by DMA method using RSAII (produced by Rheometrics) even in the case where either an epoxy resin composition or a block copolymer alone is used. That is, a traction cycle of 1 Hz is applied to a plate-like sample of 1×2.5×34 mm at a temperature of −60 to 250° C. for measuring by DMA method, and the tan δ value is employed as the glass transition temperature Tg. In this case, the sample is prepared as follows. In the case where an epoxy resin composition is used, a plate-like cured product without voids is obtained by defoaming the uncured resin composition in vacuum and subsequently curing in a mold set to make a thickness of 1 mm by a spacer having a thickness of 1 mm and made of "Teflon (registered trademark)" at a temperature of 130° C. for 2 hours. In the case where a block copolymer is used alone, a plate without voids is likewise obtained using a twin-screw extruder. Either of the plates is cut out to have the abovementioned size by using a diamond cutter and then is evaluated.

The block S is immiscible with the blocks B and M, and has a glass transition temperature Tg higher than that of the block B.

Further, in the case where the block copolymer is S-B-M, it is preferred that any of blocks S, B and M is miscible with the epoxy resin, and in the case where the block copolymer is B-M or M-B-M, it is preferred that any of blocks B and M is miscible with the epoxy resin, in view of toughness enhancement.

It is preferred that the mixed amount of the block copolymer [C] is 1 to 10 parts by mass per 100 parts by mass of all the epoxy resins in the epoxy resin composition in view of mechanical properties and adaptability to the composite production process. A more preferred range is 2 to 7 parts by mass, and a further more preferred range is 3 to 6 parts by mass. If the mixed amount is less than 1 part by mass, the toughness and plastic deformability of the cured product decline, and the impact resistance of the obtained fiber-reinforced composite material declines. If the mixed amount is more than 10 parts by mass, the elastic modulus of the cured product declines remarkably, and the static strength properties of the obtained fiber-reinforced composite material declines. In addition, the resin flow at the molding temperature is insufficient, and the obtained fiber-reinforced composite material tends to contain voids.

The introduction of a monomer other than methyl methacrylate into the aforementioned block M as a comonomer can be suitably performed in view of the miscibility with the epoxy resin and the control of various properties of the cured product. The comonomer is'not especially limited and can be selected as appropriate, but in order to obtain the miscibility with an epoxy resin with a high SP value, a monomer with an SP value higher than that of methyl methacrylate, especially a water soluble monomer can be suitably used. Above all, an acrylamide derivative can be suitably used, and especially dimethylacrylamide can be suitably used. Further, a reactive monomer can also be applied.

In this case, the SP value refers to a generally known solubility parameter, and it is an indicator of solubility and miscibility. There are a method of calculating the SP value from a physical property such as evaporation heat and a method of estimating the SP value from the molecular structure. In this description, the SP value calculated from the molecular structure on the basis of Fedors' method described in Polym. Eng. Sci., 14 (2), 147 to 154 (1974) is used, and the unit used is $(cal/cm^3)^{1/2}$.

Further, a reactive monomer means a monomer having a functional group capable of reacting with the oxirane group of an epoxy molecule or with the functional group of the curing agent. For example, monomers having a reactive functional group such as an oxirane group, amine group or carboxyl group can be enumerated, but the reactive monomer is not limited thereto. As the reactive monomer, (meth)acrylic acid (in this description, methacrylic acid and acrylic acid are generally abbreviated as "(meth)acrylic acid") or a monomer that can be hydrolyzed to provide (meth)acrylic acid can also be used. A reactive monomer can be preferably used, since the miscibility with the epoxy resin and the adhesion at the interface between the epoxy and the block copolymer can be enhanced.

As examples of the other monomer capable of constituting the block M, glycidyl methacrylate and tert-butyl methacrylate can be enumerated. It is preferred that the block M contains at least 60% of syndiotactic PMMA (polymethyl methacrylate).

The glass transition temperature Tg of the block B is 20° C. or lower, preferably 0° C. or lower, more preferably −40° C. or lower. It is preferred that the glass transition temperature Tg is lower in view of toughness, but if Tg is lower than −100° C., the fiber-reinforced composite material obtained may have a problem in terms of processability such as a rough cut surface.

It is preferred that the block B is an elastomer block, and it is preferred that the monomer used for synthesizing such an elastomer block is a diene selected from butadiene, isoprene, 2,3-dimethyl-1,3-butadiene, 1,3-pentadiene and 2-phenyl-1,3-butadiene. In particular, in view of toughness, it is preferred to select from among polybutadiene, polyisoprene, random copolymers thereof and partially or perfectly hydrogenated polydienes. As polybutadiene, 1,2-polybutadiene (Tg; approx. 0° C.), etc. can be enumerated, but it is more preferred to use, for example, 1,4-polybutadiene with the lowest glass transition temperature Tg (Tg: approx. −90° C.). The reason is that using a block B with a lower glass transition temperature Tg is advantageous in view of impact resistance and toughness. The block B can also be hydrogenated. The hydrogenation can be performed by an ordinary method.

As the monomer constituting the block B, an alkyl(meth)acrylate is also preferred. As particular examples, ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.) can be enumerated. In this case, the parenthesized value after the name of each acrylate is the Tg of the block B obtained by using the corresponding acrylate. Among these (meth)acrylates, it is preferred to use butyl acrylate. These acrylate monomers are immiscible with the acrylate of the block M containing at least 50 wt % of methyl methacrylate.

Among them, as the block B, a block consisting of a polymer selected from 1,4-polybutadiene, polybutyl acrylate and poly(2-ethylhexyl acrylate) is preferred.

In the case where a triblock copolymer S-B-M is used as the block copolymer [C], the block S is immiscible with the blocks B and M, and the glass transition temperature Tg of the block S is higher than that of the block B. It is preferred that the Tg or melting point of the block S is 23° C. or higher, and more preferred is 50° C. or higher. As examples of the block S, aromatic vinyl compounds, for example, those obtained from styrene, a-methylstyrene or vinyltoluene and those obtained from an alkyl ester of an alkyl acid and/or methacrylic acid having 1 to 18 carbon atoms in the alkyl chain can be enumerated. An aromatic vinyl compound obtained from an alkyl ester of an alkyl acid and/or ethacrylic acid having 1 to 18 carbon atoms in the alkyl chain is immiscible with the block M containing at least 50 wt 0 of methyl methacrylate.

In the case where a triblock copolymer M-B-M is used as the block copolymer [C], the two blocks M of the triblock copolymer M-B-M can be identical to or different from each other. Further, blocks obtained from the same monomer but different in molecular weight can also be used.

In the case where a triblock copolymer M-B-M and a diblock copolymer B-M are used together as the block copolymer [C], the block M of the triblock copolymer M-B-M can be identical with or different from the block M of the diblock copolymer B-M. Further, the block B of the triblock M-B-M can be identical with or different from the block B of the diblock copolymer B-M.

In the case where a triblock copolymer S-B-M and a diblock copolymer B-M and/or a triblock copolymer M-B-M are used together as the block copolymer [C], the block M of the triblock copolymer S-B-M, the respective blocks M of the triblock copolymer M-B-M and the block M of the diblock copolymer B-M can be identical with or different from each other, and the respective blocks B of the triblock copolymer S-B-M, the triblock copolymer M-B-M and the diblock copolymer B-M can also be identical with or different from each other. The block copolymer [C] can be produced by anion polymerization, for example, by the method described in European Patent No. EP524,054 or European Patent No. EP749,987.

With regard to particular examples of the triblock copolymer S-B-M, as the copolymer consisting of styrene-butadiene-methyl methacrylate, Nanostrength 123, Nanostrength 250, Nanostrength 012, Nanostrength E20 and Nanostrength E40 respectively produced by Arkema can be enumerated. With regard to particular examples of the triblock copolymer M-B-M, as the copolymer consisting of methyl methacrylate-butylacrylate-methylmethacrylate, Nanostrength M22 produced by Arkema and Nanostrength M22N obtained by copolymerizing a monomer having a high SP value with the aforementioned Nanostrength M22 produced by Arkema as the base can be enumerated. Among them, Nanostrength M22N obtained by copolymerizing a monomer having a high SP value can be preferably used for such reasons that a finely phase-separated structure can be formed and that high toughness can be obtained.

As one preferred mode of the epoxy resin composition of this invention, in the case where the amine-based curing agent of the component [B] is diaminodiphenylsulfone, it is preferred that the condensed polycyclic structure in the epoxy resin [Aa] is at least one structure selected from a naphthalene structure, fluorene structure and dicyclopentadiene structure. Above all, as the epoxy resin [Aa], an epoxy resin having an oxazolidone ring structure or naphthalene structure can be preferably, since the balance between elastic modulus and toughness is good.

If diaminodiphenylsulfone and an epoxy resin having such a structure are combined, a resin high in both heat resistance and elastic modulus and excellent in toughness can be obtained. Above all, an epoxy resin having an oxazolidone ring structure is most preferred.

In the case where the amine-based curing agent [B] is diaminodiphenylsulfone, it is preferred that the content of the component [Aa] is 30 to 80 mass % among 100 mass % of the component [A]. A more preferred range is 30 to 70 mass %, and a further more preferred range is 30 to 60 mass %. If the content is smaller than 30 mass %, the heat resistance of the cured resin can be less enhanced, and the impact resistance of the fiber-reinforced composite material declines, since the block polymer [C] is coarsely phase-separated. If the content is larger than 80 mass %, the viscosity of the epoxy resin composition becomes too high, and the productivity in the production of the prepreg and the moldability in the molding of the prepreg may decline as the case may be.

In the case where the amine-based curing agent [B] is diaminodiphenylsulfone, it is preferred that the content of the polyfunctional amine type epoxy resin [Ab1] is 20 to 70 mass % among 100 mass % of [A]. A more preferred range is 25 to 50 mass %, and a further more preferred range is 30 to 50 mass %. If the content of [Ab1] is smaller than 20 mass %, the elastic modulus of the cured product declines and the static strength properties of the fiber-reinforced composite material decline. If the content is larger than 70 mass %, the plastic deformability declines, and the impact resistance of the fiber-reinforced composite material declines, since the block copolymer [C] is coarsely phase-separated.

In the case where the amine-based curing agent [B] is diaminodiphenylsulfone and where the liquid bisphenol type epoxy resin [Ab2] is further contained, it is preferred in view of excellent toughness and handling property that 10 to 40 mass % of the liquid bisphenol type epoxy resin [Ab2] is contained among 100 mass % of the component [A]. A more preferred content range is 15 to 35 mass %, and a further more preferred range is 20 to 30 mass %. If the content is smaller than 10 mass %, the block copolymer [C] may be coarsely phase-separated, and the impact resistance of the fiber-reinforced composite material may decline as the case may be. If the content is larger than 40 mass %, the heat resistance of the fiber-reinforced composite material may decline as the case may be.

With regard to the mixed amount of the amine-based curing agent [B], it is preferred in view of heat resistance and mechanical properties that the amount of active hydrogen is 0.6 to 1.2 times the amount of the epoxy groups in the epoxy resin [A]. A more preferred range is 0.9 to 1.1 times. If the amount of active hydrogen is smaller than 0.6 time the amount of epoxy groups, the elastic modulus declines and the static strength properties of the fiber-reinforced composite material decline, since the crosslinking degree of the cured product is not sufficient. If the amount of active hydrogen is larger than 1.2 times the amount of epoxy groups, the crosslinking degree of the cured product becomes high to lower the deformability, and the impact resistance of the fiber composite material may decline as the case may be.

The average epoxy equivalent of the component [Aa] in this invention is not especially limited. However, in the case where the amine-based curing agent [B] is diaminodiphenylsulfone, it is preferred that the epoxy equivalent is in a range from 300 to 500, since the crosslinking degree of the epoxy resin declines to provide a resin composition excellent in toughness and impact resistance. The epoxy equivalent can be obtained by a publicly known titration test, but in the case where multiple epoxy resins with known epoxy equivalents are used together, rough estimation can be made as described below. Let's consider a case of using three epoxy resins together. For example, if an epoxy resin X with an epoxy equivalent of Ex (g/eq) is mixed by Wx mass %, an epoxy resin Y with an epoxy equivalent of Ey (g/eq) is mixed by Wy mass % and an epoxy resin Z with an epoxy equivalent of Ez (g/eq) is mixed by Wz mass %, then the average epoxy equivalent can be obtained from the following calculation formula:

$$\text{Average epoxy equivalent} = (Wx+Wy+Wz)/(Wx/Ex+Wy/Ey+Wz/Ez)$$

In the case where the epoxy resin composition of this invention is used particularly as a prepreg for the primary structural materials of aircraft, it is preferred that the cured product obtained by curing at 180° C. for 2 hours has a bending modulus of elasticity of 3.6 GPa or more and a glass transition temperature of 180° C. or higher. If diaminodiphenylsulfone is used as the amine-based curing agent [B], a high bending modulus of elasticity and a high glass transition temperature can be achieved concurrently, and a high open hole compressive strength under hot wet condition can be obtained.

The bending modulus of elasticity in this invention is a value obtained according to JIS K 7171-1994 by preparing a 10 mm wide 60 mm long specimen from a cured resin with a thickness of 2 mm and bending it at three points with spans of 32 mm. The glass transition temperature in this invention is a value obtained as the glass transition temperature Tg, which corresponds to the middle point of the glass transition region identified by measuring in a temperature range from 30 to 350° C. at a heating rate of 10° C./minute using DSC.°

As another preferred mode of the epoxy resin composition of this invention, in the case where dicyandiamide is used as the amine-based curing agent [B], it is preferred that the component

[Aa] is a biphenyl type epoxy resin and that the component [Ab] contains the following components [Ab1'], [Ab2] and [Ab3]:

[Ab1'] a diglycidylaniline derivative represented by the following general formula (I)

[Ab2] a liquid bisphenyl type epoxy resin

[Ab3] a solid bisphenol type epoxy resin

[Chemical formula 2]

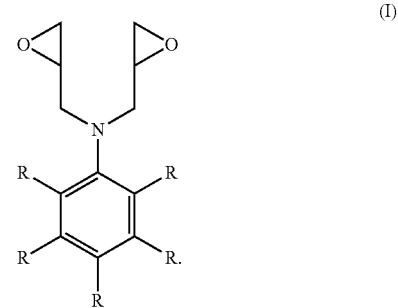

(I)

where Rs denote, respectively independently, a group selected from hydrogen, straight-chain or branched alkyl group with 1 to 5 carbon atoms, and straight-chain or branched alkoxy group with 1 to 5 carbon atoms.

In the case where dicyandiamide is used as the amine-based curing agent [B], a biphenyl type epoxy resin as the component [Aa] gives high heat resistance owing to the stiffness of the bisphenyl structure. On the other hand, the biphenyl structure is highly linear, and in the case where a cured product is obtained, plastic deformability is also high, since a highly linear network is formed. In addition, when the cured product is obtained, a biphenyl type epoxy resin is effective for obtaining a finely phase-separated structure with the block copolymer [C].

As the biphenyl structure of the biphenyl type epoxy resin, a halogen substitution product, alkyl substitution product or hydrogenation product, etc. can also be used. Especially in the light of handling property, a methyl substitution product can be preferably used.

The diglycidylaniline derivative [Ab1'] has a low viscosity and lowers the viscosity of the resin composition as a whole, and therefore is excellent in processability. Further, when the cured product is obtained, the benzene rings spread into the crosslinked structure, and therefore the free volume decreases to enhance the elastic modulus. Furthermore, when the cured product is obtained, the diglycidylaniline derivative is effective for obtaining a fine phase-separated structure with the block copolymer [C]. Among diglycidylaniline derivatives, diglycidylaniline or diglycidyltoluidine can be preferably used.

A diglycidylaniline derivative can be synthesized by reacting the corresponding aniline derivative and epichlorohydrin under a basic condition and removing hydrogen chloride. As the aniline derivative used as a raw material, aniline, toluidine, 4-n-butylaniline, 4-t-butylaniline, 2,6-diethylaniline, 2,4-dimethoxyaniline, etc. can be used.

The component [Ab2] is not especially limited, if it is a liquid bisphenol type epoxy resin, and a bisphenol A type epoxy resin, bisphenyl F epoxy resin or any of alkyl substitution products thereof, etc. can be used. Further, not only a monomer but also a polymer can also be used if it is liquid.

The component [Ab3] is not especially limited, if it is a solid bisphenol type epoxy resin, and a bisphenol A type epoxy resin, bisphenol F type epoxy resin, bisphenol S type epoxy resin, or any of halogen substitution products thereof, alkyl substitution products thereof, or hydrogenation products thereof, etc. can be used. Further, not only a monomer but also a polymer can also be suitably used. In view of toughness and the phase separation with the block copolymer [C], it is preferred to use a polymer.

As commercially available products of the solid bisphenol A type epoxy resin, "jER (registered trademark)" 1001, 1002, 1003, 1004, 1004AF, 1005, 1006FS, 1007, 1009 and 1010 (respectively produced by Japan Epoxy Resins Co., Ltd.), "Epotohto (registered trademark)" YD-011, YD-012, YD-013, YD-014, YD-017, YD-019 and YD-020G (respectively produced by Tohto Kasei Co., Ltd.), "Epiclon (registered trademark)" 860, 1050, 1055, 3050, 4050 and 7050 (respectively produced by Dainippon Ink and Chemicals, Inc.), etc. can be enumerated. As brominated bisphenol A type epoxy resins, "jER (registered trademark)" 5046B80, 5047B75, 5050, 5050T60 and 5051 (respectively produced by Japan Epoxy Resins Co., Ltd.), "Epiclon (registered trademark)" 152 and 153 (respectively produced by Dainippon Ink and Chemicals, Inc.), etc. can be enumerated.

As commercially available products of the solid bisphenol F type epoxy resin, "jER (registered trademark)" 806, 807, 4002P, 4004P, 4007P and 4009P (respectively produced by Japan Epoxy Resins Co., Ltd.), "Epotohto (registered trademark)" YDF-2001 and YDF-2004 (respectively produced by Tohto Kasei Co., Ltd.), etc. can be enumerated.

As the bisphenol S type epoxy resin, "Epiclon (registered trademark)" EXA-1514 (produced by Dainippon Ink and Chemicals, Inc.), etc. can be enumerated.

In the case where the amine-based curing agent [B] is dicyandiamide, it is preferred that the contents of respective components are in the following ranges. It is preferred that the component [Aa] is contained by 20 to 50 mass % among 100 mass % of the component [A], and a more preferred range is 25 to 40 mass %. If the content of the component [Aa] is smaller than 20 mass % on the basis of the amount of the component [A], the glass transition temperature of the cured product declines, and the heat resistance of the fiber-reinforced composite material declines. If the content of the component [Aa] is larger than 50 mass %, the viscosity of the epoxy resin composition becomes high, and a problem in terms of handling property may occur as the case may be.

It is preferred that diglycidylaniline as the component [Ab1'] is contained by 5 to 20 mass % among 100 mass % of the component [A], and a more preferred range is 10 to 20 mass %. If the content of the component [Ab1'] is smaller than 5 mass % on the basis of the amount of the component [A], the viscosity of the resin composition becomes so high as to cause a problem in terms of handling property and. to make the phase-separated structure of the block copolymer [C] coarse, and the impact resistance of the fiber-reinforced composite material may decline. Further, if the content of the component [Ab1' ] is larger than 20 mass %, the plastic deformability of the cured product' declines and the impact resistance of the fiber-reinforced composite material may decline.

It is preferred that the liquid bisphenol type epoxy resin as the component [Ab2] is contained to ensure that the sum of the components [Ab1'] and [Ab2] is 20 to 40 mass % among 100 mass % of the component [A], and a more preferred range is 25 to 40 mass %. If the sum of the components [Ab1'] and [Ab2] is smaller than 20 mass %, the viscosity of the resin composition becomes high, and therefore a problem in terms of handling property may be caused as the case may be. If the sum of the components [Ab1' ] and [Ab2] is larger than 40 mass %, the toughness of the cured product declines, and the impact resistance of the fiber-reinforced composite material may decline. Further, the phase-separated structure of the block copolymer [C] becomes coarse, and the mechanical properties and impact resistance of the fiber-reinforced composite material may decline.

It is preferred that the solid bisphenol type epoxy resin as the component [Ab3] is contained to ensure that the sum of the components [Aa] and [Ab3] is 60 to 80 mass % among 100 mass % of the component [A], and a more preferred range is 60 to 75 mass %. If the sum of the components [Aa] and [Ab3] is smaller than 60 mass %, the toughness of the resin may decline as the case may be. Further, the cured product is obtained, the coarse phase separation of the block copolymer [C] may be formed as the case may be. These matters lower the impact resistance of the fiber-reinforced composite material. If the sum of the components [Aa] and [Ab3] is larger than 80 mass %, the viscosity of the resin composition becomes high, and a problem in terms of handling property may be caused as the case may be.

In the case where dicyandiamide is used the amine-based curing agent [B], it is preferred in view of heat resistance and mechanical properties that the mixed amount thereof is 1 to 10 parts by mass per 100 parts by mass of all the epoxy resins in the epoxy resin composition, and a more preferred range is 2 to 8 parts by mass. If the mixed amount of dicyandiamide is smaller than 1 part by mass, the plastic deformability of the cured product declines, and the impact resistance of the fiber-reinforced composite material declines. If the mixed amount of dicyandiamide is larger than 10 parts by mass, the block copolymer [C] forms coarse phase separation, and the impact resistance of the fiber-reinforced composite material may decline as the case may be. It is preferred that dicyandiamide as a powder is mixed with the resin, in view of the storage stability at room temperature and the viscosity stability when the prepreg is prepared. In the case where dicyandiamide as a powder is mixed with the resin, it is preferred that the average particle size is 10 gm or less, and more preferred is 7 gm or less. If the average particle size is more than 10 gm for use as a prepreg for example, it may happen that when the reinforcing fiber bundles are impregnated with the resin composition by heating and pressurization, dicyandiamide may not penetrate into the reinforcing fiber bundles and may be left in the surface layers of the fiber bundles as the case may be.

Dicyandiamide may be used alone or may also be used in combination with a curing catalyst for dicyandiamide or with another curing agent for epoxy resins. As the curing catalyst to be used in combination with dicyandiamide, ureas, imidazoles, Lewis acid catalysts, etc. can be enumerated. As the epoxy resin curing agent, aromatic amine curing agents, alicyclic amine curing agents, acid anhydride curing agents, etc. can be enumerated. As commercially available products of ureas, DCMU99 (produced by Hodogaya Chemical Co., Ltd.), Omicure24, Omicure52 and Omicure94 (respectively produced by CVC Specialty Chemicals, Inc.), etc. can be enumerated. As commercially available products of imidazoles, 2MZ, 2PZ and 2E4MZ (respectively produced by Shikoku Chemicals Corporation), etc. can be enumerated. As Lewis acid catalysts, boron halide/base complexes such as boron trifluoride/piperidine complex, boron trifluoride/monoethylamine complex, boron trifluoride/triethanolamine complex and boron trichloride/octylamine complex can be enumerated.

In the case where dicyandiamide is used as the amine-based curing agent [B], it is preferred that the average epoxy equivalent of all the epoxy resins of the component [A] is 200 to 400. A more preferred range is 200 to 300. If the average epoxy equivalent is less than 200, the plastic deformability and toughness of the cured resin may decline. Further, the coarse phase separation of the block copolymer [C] may lower the impact resistance of the fiber-reinforced composite material. If the average epoxy equivalent is more than 400, the heat resistance of the cured resin declines, and the elastic modulus may decline to lower the mechanical strength as the case may be.

Further, the epoxy resin composition may contain other components than the components [A] to [C] to such an extent that the effect of this invention is not lost. For example, to control viscoelasticity, to enhance the tackiness and draping property of the prepreg or to enhance mechanical properties such as the impact resistance of the fiber-reinforced composite material, a thermoplastic resin soluble in the epoxy resins, organic particles such as rubber particles and thermoplastic resin particles, inorganic particles, etc. can be mixed.

It is preferred to mix a thermoplastic resin having hydrogen-bondable functional groups such as alcoholic hydroxyl groups, amide bonds or sulfonyl groups as the thermoplastic resin soluble in the epoxy resins, since the effect of enhancing the adhesiveness between the resin and the reinforcing fibers can be expected. Particularly, as the thermoplastic resin having alcoholic hydroxyl groups, polyvinyl acetal resins such as polyvinyl formal and polyvinyl butyral, polyvinyl alcohol and phenoxy resins can be enumerated. As the thermoplastic resin having amide bonds, polyamides, polyimides and polyvinyl pyrrolidone can be enumerated. As the thermoplastic resin having sulfonyl groups, polysulfones can be enumerated. The polyamides, polyimides and polysulfones may have functional groups such as ether bonds and carbonyl groups in the main chains. The polyamides may have substituent groups at the nitrogen atoms of amide groups. With regard to commercially available products of the thermoplastic resin having hydrogen-bondable functional groups and soluble in epoxy resins, as polyvinyl acetal resins, Denka Butyral and "Denka Formal (registered trademark)" (produced by Denki Kagaku Kogyo K.K.), "Vinylek (registered trademark)" (produced by Chisso Corporation) can be enumerated; as a phenoxy resin, "UCAR (registered trademark)" PKHP (produced by Union Carbide) can be named; as polyamide resins, "Macromelt (registered trademark)" (produced by Henkel Hakusui Corporation), "Amilan (registered trademark)" CM4000 (produced by Toray Industries, Inc.) can be enumerated; as polyimides, "Ultem (registered trademark)" (produced by General Electric) and "Matrimid (registered trademark)" 5218 (produced by Ciba) can be enumerated; as polysulfones, "Victrex (registered trademark)" (produced by Mitsui Chemicals, Inc.) and "UDEL (registered trademark)" (produced by Union Carbide) can be enumerated; and as polyvinyl pyrrolidone, "Rubiscol (registered trademark)" (produced by BASF Japan) can be named.

Further, as the thermoplastic resin soluble in epoxy resins, an acrylic resin can be suitably used in addition to the above-mentioned resins in view of high miscibility with epoxy resins and viscoelasticity controllability. As commercially available products of the acrylic resin, "Dianal (registered trademark)" BR series (produced by Mitsubishi Rayon Co., Ltd.) and "Matsumoto Microsphere (registered trademark)" M, M100 and M500 (produced by Matsumoto Yushi-Seiyaku Co., Ltd.), etc. can be enumerated.

As the rubber particles, crosslinked rubber particles and core-shell rubber particles having a dissimilar polymer graft-polymerized on the surfaces of crosslinked rubber particles can be preferably used in view of handling property, etc.

As commercially available products of the crosslinked rubber particles, crosslinked carboxyl-modified butadiene-acrylonitrile copolymer FX501P (produced by Japan Synthetic Rubber Co., Ltd.), fine acrylic rubber particles CX-MN series (produced by Nippon Shokubai Co., Ltd.), YR-500 series (produced by Tohto Kasei Co., Ltd.), etc. can be used.

As commercially available products of the core-shell rubber particles, for example, butadiene/alkyl methacrylate/styrene copolymer "Paraloid (registered trademark)" EXL-2655 (produced by Kureha Chemical Industry Co., Ltd.), acrylic acid ester/methacrylic acid ester copolymer "Staphyloid (registered trademark)" AC-3355 and TR-2122 (produced by Takeda Chemical Industries, Ltd.), butyl acrylate/methyl methacrylate copolymer "PARALOID (registered trademark)" EXL-2611 and EXL-3387 (produced by Rohm & Haas), "Kaneace (registered trademark)" MX series (produced by Kaneka Corporation), etc. can be used.

As the thermoplastic resin particles, polyamide particles and polyimide particles can be preferably used. As commercially available products of polyamide particles, SP-500 (produced by Toray Industries, Inc.), "Orgasol (registered trademark)" (produced by Arkema), etc. can be used.

It is preferred in view of both the elastic modulus and toughness of the obtained cured resin that the mixed amount or organic particles such as rubber particles or thermoplastic resin particles is 0.1 to 30 parts by mass per 100 parts by mass of the component [A]. A more preferred range is 1 to 15 parts by mass. In order to prepare the epoxy resin composition of this invention, a kneader, planetary mixer, three-roll mill, twin-screw extruder, etc. can be preferably used. The block copolymer [C] is added to the epoxy resin [A], and the mixture is kneaded. Subsequently with stirring, the temperature of the composition is raised to an arbitrary temperature of 130 to 180° C., and then with stirring at the same temperature, the block copolymer [C] is dissolved into the epoxy resin. After a transparent viscous liquid with the block copolymer [C] dissolved in the epoxy resin is obtained, the temperature is lowered 'preferably to 120° C. or lower, more preferably to 100° C. or lower with stirring. Then, the amine-based curing agent [B] and the curing catalyst are added, and the mixture is kneaded. This method can be preferably used for such reasons that the block copolymer [C] is unlikely to cause coarse separation and that the resin composition is excellent also in storage stability.

In the case where the epoxy resin composition of this invention is used as the matrix resin of a prepreg, it is preferred in view of processability such as tackiness and draping property that the viscosity at 80° C. is 0.1 to 200 Pa·s. A more preferred range
is 0.5 to 100 Pa·s, and a further more preferred range is 1 to 50 Pa·s. If the viscosity at 80° C. is less than 0.1 Pa·s, the form retention of the prepreg declines to cause cracking as the case may be, and further, at the time of molding, much resin flow occurs to cause the fiber content fluctuation as the case may be. If the viscosity at 80° C. is more than 200 Pa·s, thin spots may be formed in the step of forming a film from the resin composition, or non-impregnated portions may occur in the step of impregnating the reinforcing fibers.

Further, especially for use as a prepreg for the primary structural materials of aircraft, it is preferred that the lowest viscosity of the epoxy resin composition of this invention is 0.05 to 20 Pa·s, and a more preferred range is 0.1 to 10 Pa·s. If the lowest viscosity is less than 0.05 Pa·s, the form retention of the prepreg declines to cause cracking as the case may be, and further at the time of molding, much resin flow occurs to cause the reinforcing fiber content fluctuation as the case may be. If the lowest viscosity is more than 20 Pa·s, thin spots may be formed in the step of forming a film from the epoxy resin composition, and non-impregnated portions may be caused in the step of impregnating the reinforcing fibers.

The viscosity in this case refers to complex viscoelastic modulus $_r$(obtained by using and simply heating parallel plates with a diameter of 40 mm simply at a heating rate of 2° C./min and measuring at a frequency of 0.5 Hz and at a gap of 1 mm using a dynamic viscoelasticity measuring apparatus (Rheometer RDA2 produced by Rheometrics).

In the epoxy resin composition of this invention, the block copolymer [C] causes phase separation in the curing step, to form a finely phase-separated structure. To be accurate, the phase-separated structure is formed, since the block lower in miscibility with the epoxy resins among the multiple blocks of the block copolymer [C] is phase-separated during curing.

In this case, the fineness of a phase-separated structure is defined as follows. Meanwhile, a phase-separated structure is available as either a co-continuous structure or a sea-island structure, and the respective structures are defined.

In the case of a sea-island structure, the fineness of the phase-separated structure is defined by the diameters of the particles of the island phase. If the particles of the island phase are elliptically formed, the major axes of the ellipses are used, and if the particles of the island phase are amorphously formed, the diameters of the circumscribed circles are used. Further, if each of the particles of the island phase has a form of two or more concentric circles or ellipses, the diameter of the outermost circle or the major axis of the outermost ellipse is used. The major axes of all the particles of the island phase existing in predetermined regions are measured, and the number average value of the measured values is employed as the fineness of the phase-separated structure. The pre-determined regions are set as follows on the basis of a microscopic photograph. In the case where the fineness of the phase-separated structure is predicted to be in the order of 10 nm (10 nm to less than 100 nm), a photograph is taken at a magnification of 20,000×, and three 4 mm square regions are selected at random on the photograph (three 200 nm square regions on the sample). Likewise, in the case where the fineness of the phase-separated structure is predicted to be in the order of 100 nm (100 nm to less than 1000 nm), a photograph is taken at a magnification of 2,000×, and three 4 mm square regions are selected at random on the photograph (three 2 μm square regions on the sample). In the case where the fineness of the phase-separated structure is predicted to be in the order of 1 gm (1 gm to less than 10 gm), a photograph is taken at a magnification of 200×, and three 4 mm square regions are selected at random on the photograph (20 μm square regions' on the sample). If the measured fineness of the phase-separated structure does not comply with the predicted order, corresponding regions are measured at the magnification corresponding to the applicable order again, and the average value is employed. Meanwhile, when measurement is made on a photograph, particles of 0.1 mm or more are considered as the particles of the island phase.

Further, in the case where the phase-separated structure is a co-continuous structure, the fineness of the phase-separated structure is defined by the wavelength of concentration fluctuation. The wavelength of concentration fluctuation is defined as follows. That is, on a microscopic photograph, straight lines with a predetermined length are drawn, and the intersection points between each of the straight lines and the phase interface are identified. The distances between the respectively adjacent intersection points are measured, and the number average value of the measured values is employed as the wavelength of concentration fluctuation. The predetermined length is set as follows on the basis of the microscopic photograph. In the case where the wavelength of concentration fluctuation is predicted to be in the order of 10 nm (10 nm to less than 100 nm), a photograph is taken at a magnification of 20,000×, and three straight lines with a length of 20 m are selected at random on the photograph (three straight lines with a length of 1,000 nm on the sample). Likewise, in the case where the wavelength of concentration fluctuation is predicted to be in the order of 100 nm (100 nm to less than 1,000 nm), a photograph is taken at a magnification of 2,000×, and three straight lines with a length of 20 mm are selected at random on the photograph (three straight lines with a length of 10 μm on the sample). In the case where the wavelength of concentration fluctuation is predicted to be in the order of 1 μm (1 μm to less than 10 μm), a photograph is taken at a magnification of 200×, and three straight lines with a length of 20 mm are selected at random on the photograph (three straight lines with a length of 100 μm on the sample). In the case where the measured wavelength of concentration structure does not comply with the predicted order, the straight lines with the corresponding length are measured again at the magnification corresponding to the applicable order, and the average value is employed. Meanwhile, when measurement is made on a photograph, wavelengths of concentration fluctuation of 0.1 mm or more are considered as the wavelengths of concentration fluctuation of the co-continuous structure.

As the microscopic photograph, a cross section of a cured resin can be photographed using a scanning electron microscope or transmission electron microscope. As required, osmium or the like can be used for staining. The staining can be performed by an ordinary method.

It is preferred that the fineness of the phase-separated structure is in a range from 10 to 1,000 nm. A more preferred range is 10 to 200 nm. Especially in the case where the component [B] is dicyandiamide, it is more preferred that the fineness of the phase-separated structure is 50 nm or less. If the fineness of the phase-separated structure is less than 10 nm, the cured product can be regarded to be virtually uniform, and the effect of enhancing the toughness by the dispersion of the block copolymer [C] does not appear. Further, if the fineness of the phase-separated structure is more than 1,000 nm, to show coarse phase separation, the plastic deformability and toughness of the cured product decline and the impact resistance of the fiber-reinforced composite material may decline as the case may be.

The effect of enhancing the toughness by the dispersion of the block copolymer [C] is exhibited when the cracks reaching the disperse phase, because (i) stresses are concentrated on the disperse phase, to cause cavitation, (ii) the resin is shear-deformed on the basis of the cavitation, (iii) the disperse phase per se is deformed to absorb energy, and (iv) crack propagation is inhibited by the disperse phase. Among the above, (i) and (ii) contribute greatly. For a disperse phase to cause cavitation, it is necessary that the fineness of the disperse phase is smaller than the diameters of the plastic deformation regions at the tips of cracks.

As the reinforcing fibers used in this invention, glass fibers, carbon fibers, graphite fibers, aramid fibers, boron fibers, alumina fibers, silicon carbide fibers, etc. can be enumerated. Two or more types of these reinforcing fibers can also be used as a mixture. In order to obtain a molded article lighter in weight and higher in durability, it is preferred to use carbon fibers or graphite fibers.

All types of carbon fibers and graphite fibers can be used to respond to applications, but carbon fibers with a tensile modulus of elasticity of 150 to 900 GPa measured in the strand tensile test according to the method described in JIS R 7601 are preferred, since a composite material excellent in impact resistance and high in stiffness and mechanical strength can be obtained. If such reinforcing fibers are used, the effect of this invention tends to be especially remarkably exhibited.

The mode of reinforcing fibers is not especially limited. For example, long fibers paralleled in one direction, tows, woven fabrics, mats, knits, braids, short fibers chopped to a length of less than 10 mm, etc. can be used. In this case, the long fibers refer to single fibers or fiber bundles substantially continuous for 10 mm or more. Further, the short fibers refer to single fibers or fiber bundles cut to a length of less than 10 mm. Furthermore, especially for an application requiring a high specific strength and a high specific elastic modulus, reinforcing fibers arranged in parallel in one direction are most suitable, but an arrangement like cloth (woven fabric) easy to handle is also suitable for this invention.

The prepreg of this invention can be obtained by impregnating reinforcing fibers with the aforementioned epoxy resin composition used as the matrix resin. As the method for impregnating reinforcing fibers with an epoxy resin composition, a wet method, hot melt method (dry method), etc. can be used.

The wet method is a method of dissolving an epoxy resin composition into a solvent such as methyl ethyl ketone or methanol, to lower the viscosity, immersing reinforcing fibers into the epoxy resin composition solution, subsequently pulling up, and evaporating the solvent using an oven, etc. The hot melt method (dry method) is a method of impregnating reinforcing fibers directly with an epoxy resin composition lowered in viscosity by heating, or a method of once coating releasing paper or the like with an epoxy resin composition, to prepare a film, overlaying the aforementioned film on both the sides or one side of reinforcing fibers, and heating and pressurizing to impregnate the reinforcing fibers with the epoxy resin composition. The hot melt method is a preferred mode in this invention, since no solvent substantially remains in the prepreg.

The fiber-reinforced composite material of this invention can be prepared by a method of laminating plies of the obtained prepreg, and applying a pressure to the laminate while heating and curing the matrix resin, etc. In this case, as the method of giving heat and pressure, a press molding method, autoclave molding method, backing molding method, wrapping tape method and internal pressure molding method, etc. can be used.

The autoclave molding method is a method of laminating plies of a prepreg on a tool plate with a predetermined shape, covering with a backing film, and pressurizing and heating for curing while degassing the laminate. A molded article with excellent mechanical properties and high appearance quality can be obtained for such reasons that the fiber orientation can be precisely controlled and that few voids are formed.

The wrapping tape method is a method of winding a prepreg around a core such as a mandrel, for forming a tubular body made of a fiber-reinforced composite material and is suitable for preparing rod-like bodies such as golf shafts and fishing rods. More particularly, it is a method for obtaining a tubular body by winding a prepreg around a mandrel, winding a thermoplastic film as a wrapping tape around the outside of the prepreg for fixing and pressurizing the prepreg, heating and curing the resin in an oven, and pulling out the mandrel.

Further, the inner pressure molding method is a molding method of setting a preform having a prepreg wound around an internal pressure applying body such as a tube made of a thermoplastic resin, into a mold, introducing a gas with a high pressure into the internal pressure applying body, for applying a pressure, and simultaneously heating the mold. This method can be preferably used for molding tubular bodies such as bicycle frames, golf shafts and bats, and in addition, complicated shapes such as rackets for tennis, badminton, etc.

The fiber-reinforced composite material of this invention can also be prepared by a method of impregnating reinforcing fibers directly with an epoxy resin composition without using a prepreg, and subsequently heating and curing, for example, a molding method such as a hand lay-up method, filament winding method, pultrusion method, resin injection molding method, or resin transfer molding method, etc. In these methods, it is preferred to prepare an epoxy resin composition by mixing two components, i.e., a main component comprising an epoxy resin and an epoxy resin curing agent immediately before use.

The fiber-reinforced composite material using the epoxy resin composition of this invention as the matrix resin can be suitably used for sports applications, aircraft applications and general industrial applications. More particularly, it can be suitably used for aerospace applications including aircraft primary structural material applications as main wings, tail assemblies, floor beams, etc., secondary structural material applications as flaps, ailerons, cowlings, fairings, interior materials, etc., and rocket motor case and artificial satellite structure applications, etc. Among these aerospace application, the fiber-reinforced composite material of this invention can be especially suitably used for aircraft primary structural material applications requiring impact resistance and tensile strength at low temperature since high-altitude flights are exposed to low temperature, particularly as fuselage skins and main wing skins. Further, for sports application, it is suitably used for bicycles, golf shafts, bats, fishing rods, racket applications for tennis, badminton, squash, etc., stick applications for hockey, etc., ski pole applications, etc. Further for general industrial applications, it can be suitably used for structural materials of moving bodies such as motor vehicles, ships and rolling stock, drive shafts, plate springs, windmill blades, pressure vessels, fly wheels, papermaking rolls, civil engineering and architectural material applications as roof materials, cables, reinforcing bars and repair reinforcing materials, etc.

EXAMPLES

The epoxy resin composition of this invention is explained below in more detail in reference to examples. The following resins were used as raw materials for obtaining the resin compositions of the respective working examples.

[Aa] Epoxy Resins
Epoxy resin having an oxazolidone ring structure, XAC4151 (produced by Asahi Kasei Epoxy Co., Ltd.)
Epoxy resin having an oxazolidone ring structure, AER4152 (produced by Asahi Kasei Epoxy Co., Ltd.)
Naphthalene type epoxy resin ("Epiclon (registered trademark)" HP4032D, produced by Dainippon Ink and Chemicals, Inc.)
Naphthalene type epoxy resin ("Epiclon (registered trademark)" HP4700, produced by Dainippon Ink and Chemicals, Inc.)
Naphthalene type epoxy resin ("Epiclon (registered trademark)" HP4770, produced by Dainippon Ink and Chemicals, Inc.)
Naphthalene type epoxy resin (NC7300 (produced by Nippon Kayaku Co., Ltd.))
Dicyclopentadiene type epoxy resin ("Epiclon" (registered trademark) HP7200 (produced by Dainippon Ink and Chemicals, Inc.)
Biphenyl type epoxy resin ("jER" (registered trademark) YX4000H, YX4000 (produced by Japan Epoxy Resins Co., Ltd.)
Fluorene type epoxy resin ("ONCOAT (registered trademark)" EX-1010 (produced by Nagase & Co., Ltd.)

[Ab1] Polyfunctional Amine Type Epoxy Resins
Tetraglycidylaminodiphenylmethane, ELM434 (produced by Sumitomo Chemical Co., Ltd.)
Triglycidylaminophenol, "Araldite" MY0500 (produced by Huntsman Advanced Materials)
Triglycidylaminophenol, "Sumiepoxy (registered trademark)" ELM120 produced by Sumitomo Chemical Co., Ltd.)
Diglycidylaniline (Diglycidylaniline (GAN), produced by Nippon Kayaku Co., Ltd.)
Diglycidyltoluidine (Diglycidyltoluidine (GOT), produced by Nippon Kayaku Co., Ltd.)

[Ab2] Liquid Bisphenol Type Epoxy Resins
Bisphenol A type epoxy resin, "Epotohto" YD128 (produced by Tohto Kasei Co., Ltd.)
Bisphenol F type epoxy resin ("Epiclon (registered trademark)" 830, (produced by Dainippon Ink and Chemicals, Inc.)
Bisphenol A type epoxy resin, "jER" (registered trademark) 828 (produced by Japan Epoxy Resins Co., Ltd.)

[Ab3] Solid Bisphenol Type Epoxy
Bisphenol A type epoxy resins ("jER (registered trademark)" 1004AF, produced by Japan Epoxy Resins Co., Ltd.)
Bisphenol A type epoxy resin ("jER (registered trademark)" 1007, produced by Japan Epoxy Resins Co., Ltd.)
Bisphenol F type epoxy resin (Epotohto (registered trademark)" YDF2001, produced by Tohto Kasei Co., Ltd.)
Bisphenol F type epoxy resin "jER" (registered trademark) 4004P (produced by Japan Epoxy Resins Co., Ltd.)

[Other Epoxy Resins]
Novolak type epoxy resin, "jER" (registered trademark) 152 (produced by Japan Epoxy Resins Co., Ltd.)
Triphenylmethane type epoxy resin EPPN-501H (produced by Nippon Kayaku Co., Ltd.)

[B] Epoxy Resin Curing Agents
4,4'-DDS (4,4'-diaminodiphenylsulfone, curing agent, produced by Sumitomo Chemical Co., Ltd.)
3,3'-DDS (3,3'-diaminodiphenylsulfone, curing agent, produced by Wakayama Seika Kogyo Co., Ltd.)
Dicyandiamide (curing agent, DICY7, produced by Japan Epoxy Resins Co., Ltd.)

[C] Block Copolymers
S-B-M copolymer "Nanostrength" (registered trademark) E20, E40 in which S is styrene (Tg: 90° C.), B is 1,4-butadiene (Tg: −90° C.), and M is methyl methacrylate (Tg: 130° C.) (produced by Arkema)
M-B-M block copolymers "Nanostrength" (registered trademark) M22, "Nanostrength" (registered trademark) M22N in which B is butyl acrylate (Tg: −54° C.), and M is methyl methacrylate (Tg: 130° C.) (produced by Arkema)

[Curing Accelerators]
DCMU99 (3-(3,4-dichlorophenyl)-1,1-dimethylurea, curing accelerator, produced by Hodogaya Chemical Co., Ltd.) [Other Components]
Polyvinyl acetal resin ("Vinylek (registered trademark)" K, produced by Chisso Corporation) Isocyanate compounds
Diisocyanate compound (toluene diisocyanate, produced by Tokyo Chemical Industry Co., Ltd.)
Polyisocyanate compound ("Millionate (registered trademark)" MR-100, produced by Nippon Polyurethane Industry Co., Ltd.)

Respective physical properties were measured under the following conditions. The measurement was made in an environment of 23° C. temperature and 50% relative humidity unless otherwise stated.

(1) Preparation of Epoxy Resin Composition

In the case where diglycidylaniline or diglycidyltoluidine was not used as the component [Ab1], predetermined amounts of ingredients other than a curing agent and a curing accelerator were added into a kneader, and the mixture was heated to 160° C. with kneading, and kneaded at 160° C. for 1 hour, to obtain a transparent viscous liquid. With kneading, it was cooled to 80° C. and subsequently predetermined amounts of a curing agent and a curing accelerator were added and the mixture was further kneaded to obtain an epoxy resin composition. Further, in the case where diglycidylaniline or diglycidyltoluidine was used as the component [Ab1], predetermined amounts of ingredients other than diglycidylaniline, a curing agent and a curing accelerator were added into a kneader, and the mixture was heated to 160° C. with kneading, and kneaded at 160° C. for 1 hour, to obtain a transparent viscous liquid. It was cooled to 80° C. with kneading, and predetermined amounts of diglycidylaniline, a curing agent and a curing accelerator were added, and the mixture was further kneaded to obtain an epoxy resin composition.

(2) Measurement of the Viscosity of an Epoxy Resin Composition (Working Examples 25 to 36, and Reference Working Examples 8 to 13)

The viscosity of an epoxy resin composition was obtained by using and simply heating parallel plates with a diameter of 40 mm at a heating rate of 2° C./min and measuring at a frequency of 0.5 Hz and at a gap of 1 mm using a dynamic viscoelasticity measuring apparatus (ARES: produced by TA Instruments).

(3) Bending Modulus of Elasticity and Deflecting in Bending of a Cured Resin

The epoxy resin composition prepared in (1) was defoamed in vacuum, and injected into a mold set to have a thickness of 2 mm using a 2 mm thick "Teflon (registered trademark)" spacer. In the case where diaminodiphenylsulfone was used as the epoxy curing agent, curing was performed at a temperature of 180° C. for 2 hours, and in the case where dicyandiamide was used as the epoxy curing agent, curing was performed at a temperature of 130° C. for 2 hours, to obtain a 2 mm thick cured resin. From the obtained cured resin plate, a 10 mm wide and 60 Mil long specimen was cut out and measured by bending at three points with spans of 32 mm according to JIS K 7171-1994, to obtain the bending modulus of elasticity and the deflection in bending.

(4) Heat Resistance of a Cured Resin

From the cured resin plate produced in the section (3) above, 7 mg of the cured resin was taken out and measured at a heating rate of 10° C./min in a temperature range from 30° C. to 350° C. using DSC2910 (type) produced by TA Instruments, and the middle point temperature obtained on the basis of JIS K 7121-1987 was employed as the glass transition temperature Tg, for evaluating heat resistance.

(5) Measurement of Toughness ($K_{1C}$) of a Cured Resin

An uncured epoxy resin composition was defoamed in vacuum, and cured in a mold set to have a thickness of 6 mm by a 6 mm thick Teflon (registered trademark) spacer at a temperature of 180° C. for 2 hours in the case where diaminodiphenylsulfone was used as the epoxy curing agent or at a temperature of 130° C. for 2 hours in the case where dicyandiamide was used as the epoxy curing agent unless otherwise stated, to obtain a 6 mm thick cured resin. The cured resin was cut to a size of 12.7×150 mm, for obtaining a specimen. An Instron universal tester (produced by Instron) was used to process and test the specimen according to ASTM D5045 (1999). An initial pre-crack was introduced into the specimen by applying the blade of a razor cooled to the temperature of liquid nitrogen to the specimen and giving impact to the razor by a hammer. The toughness of the cured resin refers to the critical stress strength of deformation mode 1 (open type).

(6) Measurement of Fineness of a Phase-Separated Structure

The cured resin obtained in the section (5) above was stained, and a thin section was obtained from it. A transmission electron image was obtained using a transmission electron microscope (TEM) under the following conditions. As the staining agent, $OsO_4$ and $RuO_4$ were used selectively in response to the resin composition, in order to achieve a sufficient contrast in the morphology.

Apparatus: H-7100 transmission electron microscope (produced by Hitachi, Ltd.)
Accelerating voltage: 100 kV
Magnification: 10,000×

The image was used to observe the wavelengths of concentration fluctuation of the component [A] rich phase and the component [C] rich phase. The phase-separated structure of the cured product became a co-continuous structure or a sea-island structure, depending on the types and ratio of the components [A] and [C]. Therefor, the respective structures were measured as follows.

In the case of a co-continuous structure, straight lines with a predetermined length were drawn on a microscopic photograph, and the intersection points between each of the straight lines and the phase interface were identified. The distances between the respectively adjacent intersection points were measured, and the number average value of all the measured distances was employed as the wavelength of concentration fluctuation. The predetermined length was set as described below on the basis of the microscopic photograph. In the case where the wavelength of concentration fluctuation was predicted to be in the order of 0.01 gm (0.01 gm to less than 0.1 gm), a photograph was taken at a magnification of 20,000×, and three straight lines with a length of 20 mm were selected at random on the photograph (three lengths with a length of 1 gm on the sample). Likewise, in the case where the wavelength of concentration fluctuation was predicted to be in the order of 0.1 gm (0.1 gm to less than 1 gm), a photograph was taken at a magnification of 2,000×, and three straight lines with a length of 20 mm were selected at random on the photograph (three straight lines with a length of 10 μm on the sample). In the case where the wavelength of concentration fluctuation was predicted to be in the order of 1 gm (1 gm to less than 10 gm), a photograph was taken at a magnification of 200×, and three straight lines with a length of 20 mm were selected at random on the photograph (three straight lines with a length of 100 μm on the sample). In the case where the measured wavelength of concentration fluctuation did not comply with the predicted order, the straight lines with the corresponding length were measured again at the magnification corresponding to the applicable order, and the average value was employed.

Further, in the case of a sea-island structure, the major axes of all the particles of the island phase existing in predetermined regions were measured, and the number average value of them was employed as the diameter, of the island phase. In this case, as the predetermined regions, in the case where the diameter of the island phase was predicted to be less than 100 nm from the obtained image, a photograph was taken at a magnification of 20,000×, and three 20 mm square regions were selected at random on the photograph (three 1 μm square regions on the sample). Likewise, in the case where the diameter of the island phase was predicted to be in the order of 0.1 gm (0.1 μm to less than 1 gm), a photograph was taken at a magnification of 2,000×, and three 20 mm square regions were selected at random on the photograph (10 μm square regions on the sample). In the case where the diameter of the island phase was predicted to be in the order of 1 μm (1 μm to less than 10 μm), a photograph was taken at a magnification of 200×, and three 20 mm square regions were selected at random on the photograph (three 100 μm regions on the sample). In the case where the diameter of the island phase did not comply with the predicted order, corresponding regions were measured at the magnification corresponding to the applicable order again, and the average value was employed.

(7) Compressive Strength after Impact and Open Hole Compressive Strength Under Hot Wet Condition, of a Fiber-Reinforced Composite Material In Working Examples 1 to 24 and Reference Working Examples 1 to 7, tests were performed according to the following procedures.

[Preparation of a Prepreg]

1. The epoxy resin composition prepared in the section (1) above was applied to releasing paper using a knife coater, to prepare a resin film. Then, two such resin films were overlaid, from both sides, on carbon fibers "Torayca" (registered trademark) T800G-24K-31E (24,000 fibers, tensile strength 5.9 GPa, tensile modulus of elasticity 290 GPa, tensile elongation 2.0%) arranged like a sheet in one direction, produced by Toray Industries, Inc., and the laminate was heated and pressurized to impregnate the carbon fibers with the resin. A unidirectional prepreg with a carbon fiber weight per unit area of 190 g/m$^2$ and with a matrix resin weight content of 35.5% was obtained.

[Preparation of a Fiber-Reinforced Composite Material and Compressive Strength after Impact]

Twenty four plies of the unidirectional prepreg prepared according to the abovementioned method were laminated in (+45°/0°/−45°/90°)3s configuration pseudo-isotropically, and molded in an autoclave at a heating rate of 1.5° C./min at a pressure of 0.59 MPa and at a temperature of 180° C. for 2 hours, to prepare a laminate. From the laminate, a 150 mm long×100 mm wide sample was cut out, and according to JIS K 7089-1996, a falling weight impact of 6.7 J/mm was applied to the central portion of the sample, to obtain the compressive strength after impact.

Preparation of a Fiber-Reinforced Composite Material and Open Hole Compressive Strength Under Hot Wet Condition]

Sixteen plies of the unidirectional prepreg prepared according to the abovementioned method were laminated in) (+45°/0°/−45°/90°)2s configuration pseudo-isotropically, and molded in an autoclave at a heating rate of 1.5° C./min at a pressure of 0.59 MPa and at a temperature of 180° C. for 2 hours, to prepare a laminate. From the laminate, a 305 mm long×25.4 mm wide sample was cut out, and a hole with a diameter of 6.35 mm was drilled at the central portion to prepare a open hole sheet. The open hole sheet was immersed in hot water with a temperature of 72° C. for 2 weeks, and the compressive strength in an atmosphere with a temperature of 82° C. was obtained according to SACMA SRM 3R-94.

(8) Charpy Impact Test of a Tubular Body Made of a Composite Material

In Working Examples 25 to 36 and Reference Working Examples 8 to 13, tests were performed according to the following procedures.

[Preparation of a Prepreg]

The epoxy resin composition prepared in the section (1) above was applied to releasing paper using a knife coater, to prepare a resin film. Then, two such resin films were overlaid, from both sides, on carbon fibers "Torayca" (registered trademark) T700SC-24K (24,000 fibers, tensile modulus of elasticity 230 GPa, tensile strength 500 kgf/mm$^2$) arranged like a sheet in one direction, produced by Toray Industries, Inc., and the laminate was heated and pressurized to impregnate the carbon fibers with the resin composition. A T700SC-containing unidirectional prepreg with a carbon fiber weight per unit area of 155 g/m$^2$ and with a fiber weight content of 72% was obtained.

Further, an M4OSC-containing unidirectional prepreg with a carbon fiber weight per unit area of 125 g/m$^2$ and a fiber weight content of 75% was prepared according to the same procedure except that carbon fibers Torayca M4OSC-12K (produced by Toray Industries, Inc, tensile modulus of elasticity 380 GPa, a tensile strength 4900 MPa) were used as reinforcing fibers.

[Preparation of a Tubular Body Made of a Composite Material for Charpy Impact Test]

A tubular body made of a composite material with an inner diameter of 6.3 mm was prepared by laminating plies of the T700SC-containing unidirectional prepreg in such a manner that the fiber direction of three plies each might be 45° or −45° with respect to the cylindrical axis direction and further laminating three plies of the T700SC-containing unidirectional prepreg in such a manner that the fiber direction might be parallel to the cylindrical axis direction, according to the following steps (a) to (e). A round bar made of stainless steel with a diameter of 6.3 mm and a length of 1,000 mm was used as the mandrel.

(a) From the T700S-containing unidirectional prepreg prepared according to the abovementioned method, two 72 mm long and 650 mm wide rectangular sheets were cut out (in such a manner that the fiber axis direction might be 45 degrees with respective to the .long side direction). The two prepreg plies were stuck in such a manner that the fiber directions of the two prepreg plies might cross each other and that the prepreg plies might be shifted in the short side direction by a distance of 10 mm (corresponding to one half of the circumference of the mandrel).

(b) The mandrel was turned to ensure that the long sides of the rectangular plies of the prepreg stuck to the releasably treated mandrel might agree with the mandrel axis direction.

(c) A 85 mm long and 650 mm wide rectangular sheet (the long side direction might be the fiber axis direction) cut out from the abovementioned T700SC-containing unidirectional prepreg was wound around the prepreg covering the mandrel in such a manner that the fiber direction might agree with the mandrel axis direction.

(d) Further, a wrapping tape (heat-resistant film tape) was wound around the prepreg covering the mandrel and the taped mandrel was heated for molding at 130° C. for 90 minutes in a curing furnace. Meanwhile, the wrapping tape had a width of 15 mm and wound at a tension of 3.0 kg and at a winding pitch (shift distance) of 1.0 mm. The tape was wound in two plies.

(e) Then, the mandrel was pulled out and the wrapping tape was removed to obtain a tubular body made of a composite material.

[Charpy Impact Test of a Tubular Body Made of a Composite Material]

The tubular body made of a composite material obtained by the abovementioned method was cut to a length of 60 mm, to prepare a specimen with an inner diameter of 6.3 mm and a length of 60 mm.

An impact was given from a lateral face of the tubular body with a weight of 300 kg·cm to perform a Charpy impact test. The Charpy impact value refers to a value obtained by dividing the obtained total absorption energy by the sectional area of the specimen.
Charpy impact value (J/m$^2$)=Total absorption energy (J)/Sectional area of the specimen (m$^2$)

Meanwhile, no notch was introduced into the specimen. The measurement was made 10 times, and the average value was used · for comparison.

(9) Glc Test of a Flat Plate Made of a Composite Material

In Working Examples 25 to 36 and Reference Working Examples 8 to 13, tests were performed according to the following procedures. [Preparation of a flat plate made of a composite material for open mode toughness (Glc) test]

The flat plate was prepared according to the following steps (a)' to (f) in conformity with JIS K 7086.

(a) Twenty plies of the T700SC-containing unidirectional prepreg prepared by the abovementioned method were laminated with the fiber directions thereof kept in parallel. However, a 40 mm film was held in the central interface of the laminate (between 10$^{th}$ ply and 11$^{th}$ ply) at right angles to the fiber arrangement direction.

(b) The laminated prepreg was covered with a nylon film without allowing any clearance to be formed, and heated and pressurized at 135° C. and at an inner pressure of 588 kPa in an autoclave for 2 hours, to be cured, for forming a unidirectional fiber-reinforced composite material.

(c) The unidirectional fiber-reinforced 'composite material obtained in (b) was cut to a size of 20 mm width and 195 mm length. The cutting was made in such a manner that the fiber direction might be parallel to the length side of the sample.

(d) According to JIS K 7086, a block (25 mm long, made of aluminum) for pin loading was bonded to an end of the specimen (on the side having the film held).

(e) The film-inserted portion was opened by a sharp cutter such as a knife, to introduce a pre-crack of 2 mm to 5 mm.

(f) In order to facilitate the observation of crack propagation, the specimen was coated with a white paint on both sides.

[Glc Test of a Flat Plate Made of a Composite Material]

According to JIS K 7086 (2006), an Instron universal tester (produced by Instron) was used for testing. The crosshead speed was 0.5 mm/min till the crack propagation reached 20 mm and 1 mm/min after reaching 20 mm. From the load, displacement and crack length, Glc was calculated.

(10) 90° Bending Test of a Flat Plate Made of a Composite Material

In Working Examples 25 to 36 and Reference Working Examples 8 to 13, tests were performed according to the following procedures.

[Preparation of a Flat Plate Made of a Composite Material for 90° Bending Test]

The flat plate was prepared according to the following steps (a) and (b).

(a) Twenty one plies of the T700SC-containing unidirectional prepreg prepared according to the abovementioned method were laminated (2 mm thick) with the fiber directions thereof kept in parallel. The obtained laminate was cured under the same conditions as in (b) of the abovementioned Glc test.

(b) The unidirectional fiber-reinforced composite material obtained in (a) was cut to a size of 15 mm width and 60 mm length. In this case, the cutting was made in such a manner that the fiber direction might be parallel to the width side of the sample.

[90° Bending Test of a Flat Plate Made of a Composite Material]

According to JIS K 7017 (1999), an Instron universal tester (produced by Instron) was used to measure at a crosshead speed of 1.0 mm/min with a span of 40 mm and with an indenter diameter of 10 mm and a fulcrum diameter of 4 mm, and 90° bending strength was calculated. The mixing ratios of components in the respective working examples and the properties of the respective working examples and comparative examples measured according to the abovementioned respective methods are shown collectively in Tables 1 to 7.

Reference Example 1

Zero point zero five part by mass of tetrabutylammonium bromide was added to 100 parts by mass of a bisphenol F type epoxy resin (Epiclon 830), and with stirring the mixture was heated to 175° C. Then, 20 parts by mass of toluene diisocyanate were supplied,
taking 3 hours, and the mixture was further stirred at 175° C. for 4 hours, to obtain an isocyanate modification product of the bisphenol F type epoxy resin.

Further, a phenol novolak type epoxy resin (jER152) and toluene diisocyanate were used as raw materials to obtain an isocyanate modification product of the novolak type epoxy resin likewise.

Furthermore, MR-100 as the polyisocyanate compound was used as a raw material and YD128 was used as a bisphenol A type epoxy resin, to obtain a polyisocyanate modification product of the bisphenol A type epoxy.

Working Example 1

As shown in Table 1, in the case where XAC4151 was used as [Aa], MY0500, as [Ab1], 4,4'-DDS, as the curing agent [B] and (Nanostrength)" (registered trademark) E20F, as [C], the wavelength of concentration fluctuation in the phase separated-structure was rather coarse, but the mechanical properties of the composite were good.

Working Example 2

An epoxy resin composition was prepared likewise as in Working Example 1, except that (Nanostrength)" (registered trademark) M22 was used as [C]. The wavelength of concentration fluctuation in the phase-separated structure was rather coarse, but the mechanical properties of the composite were good.

Working Example 3

An epoxy resin composition was prepared likewise as in Working Example 1, except that (Nanostrength)" (registered trademark) M22N was used as [C]. The fineness of the phase-separated structure was fine. As a result, the deflection in bending of the resin and the toughness of the resin were enhanced, and composite properties were also enhanced.

Working Example 4

An epoxy resin composition was prepared likewise as in Working Example 3, except that the mixed amount of [C] was decreased to 1.5 parts by mass. The toughness of the resin rather declined. As a result, the compressive strength after impact as a composite property declined but remained at a level of no problem.

Working Example 5

An epoxy resin composition was prepared likewise as in Working Example 3, except that the mixed amount of [C] was increased to 8 parts by mass. The elastic modulus of the resin declined. As a result the open hole compressive strength as a composite property declined but remained at a level of no problem.

Working Example 6

An epoxy resin composition was prepared likewise as in Working Example 3, except that AER4152 was used as [Aa]. Both the physical properties of the resin and the mechanical properties of the composite were good.

Working Example 7

An epoxy resin composition was prepared likewise as in Working Example 3, except that ELM434 was used as [Ab1]. The fineness of the phase-separated structure was fine, and both the physical properties of the resin and composite properties were good.

Working Example 8

An epoxy resin composition was prepared likewise as in Working Example 7, except that the mixed amount of [Aa]

was decreased to 30 parts by mass and that the mixed amounts of [Ab1] and [Ab2] were changed somewhat in this connection. Both the physical properties of the resin and composite properties were good.

Working Example 9

An epoxy resin composition was prepared likewise as in Working Example 3, except that the mixed amount of [Ab1] was decreased to 20 parts by mass and that the mixed amount of [Ab2] was changed somewhat in this connection. Both the bending modulus of elasticity of the resin and the toughness of the resin declined, and as a result composite properties declined but remained at levels of no problem.

Working Example 10

An epoxy resin composition was prepared likewise as in Working Example 3, except that the mixed amount of [Aa] was decreased to 30 parts by mass and that the mixed amount of [Ab1] was changed somewhat in this connection. The phase-separated structure was rather coarse. However, the elastic modulus of the resin was enhanced, and composite properties were at levels of no problem.

Working Example 11

An epoxy resin composition was prepared likewise as in Working Example 3, except that the mixed amount of [Aa] was decreased to 30 parts by mass and that the mixed amount of [Ab2] was changed somewhat in this connection. Both the physical properties of the resin and composite properties were at levels of no problem.

Working Example 12

An epoxy resin composition was prepared likewise as in Working Example 3, except that the mixed amount of [Aa] was increased to 70 parts by mass and that the mixed amounts of [Ab1] and [Ab2] were changed somewhat in this connection. The bending modulus of elasticity of the resin rather declined, but both the physical properties of the resin and the mechanical properties of the composite were at levels of no problem.

Working Example 13

An epoxy resin composition was prepared likewise as in Working Example 3, except that 3,3'-DDS was used as [B]. Heat resistance declined. However, the elastic modulus of the resin and the toughness of the resin were dramatically enhanced, and the mechanical properties of the composite were also good.

Working Example 14

An epoxy resin composition was prepared likewise as in Working Example 8, except that 3,3'-DDS was used as [B]. Heat resistance declined. However, the elastic modulus of the resin and the toughness of the resin were dramatically enhanced, and the mechanical properties of the composite were also good.

Working Example 15

An epoxy resin composition was prepared likewise as in Working Example 13, except that the isocyanate modification product of the novolak type epoxy resin produced in Reference Example 1 was used as [Aa]. Heat resistance was enhanced, and the mechanical properties of the composite were also good.

Working Example 16

An epoxy resin composition was prepared by using the modification product of the bisphenol F type epoxy resin produced in Reference Example 1 and HP4032D as [Aa] and using ELM120 as [Ab1]. The fineness of the phase-separated structure was rather coarse, but both the physical properties of the resin and the mechanical properties of the composite were good.

Working Example 17

An epoxy resin composition was prepared by using HP4700 as [Aa] and Epiclon 830 as [Ab2]. Both the physical properties of the resin and the mechanical properties of the composite were good.

Working Example 18

An epoxy resin composition was prepared by using HP4770 as [Aa] and jER152 as the other epoxy resin. Both the physical properties of the resin and the mechanical properties of the composite were good.

Working Example 19

An epoxy resin composition was prepared likewise as in Working Example 3, except that NC7300 was used as [Aa]. Both the physical properties of the resin and the mechanical properties of the composite were good.

Working Example 20

An epoxy resin composition was prepared by using YX4000H as [Aa] and jER152 as the other epoxy component. Both the physical properties of the resin and the mechanical properties of the composite were good.

Working Example 21

An epoxy resin composition was prepared by using HP7200 as [Aa] and EPPN-501H as the other epoxy resin component. Both the physical properties of the resin and the mechanical properties of the composite were good.

Working Example 22

An epoxy resin composition was prepared likewise as in Working Example 3, except that EX-1010 was used as [Aa]. Both the physical properties of the resin and the mechanical properties of the composite were good.

Working Example 23

An epoxy resin composition was prepared by using HP7200 as [Aa] and ELM434 and GOT as [Ab1]. The heat resistance rather declined. However, the bending modulus of elasticity of the resin was enhanced, and composite properties were also good.

Working Example 24

An epoxy resin composition was prepared likewise as in Working Example 13, except that the polyisocyanate modification product of the bisphenol A type epoxy resin produced in Reference Example 1 was used as [Aa]. The heat resistance was enhanced, and the mechanical properties of the composite were also good.

Working Example 25

An epoxy resin composition was prepared by using YX4000 as the component [Aa], GAN as the component [Ab1'], YD128.as [Ab2], jER1004AF and jER1007 as the component [Ab3], dicyandiamide as [B] and (Nanostrength)" (registered trademark) M22N as the component [C]. The Charpy impact value of the tubular body of a composite material and the Glc of the flat plate of the composite material showed high values.

Working Example 26

An epoxy resin composition was prepared likewise as in Working Example 25, except that all the jER1007 was substituted by jER1004AF as the component [Ab3]. Since. the crosslinking density was enhanced, the heat resistance was enhanced, but the toughness declined. Further, the phase-separated structure became rather coarse, and the Charpy impact value of the tubular body of the composite material and the Gic of the flat plate of the composite material rather declined but remained at levels of no problem.

Working Example 27

An epoxy resin composition was prepared likewise as in Working Example 25, except that the rates of YX4000 of [Aa] and jER1004AF of [Ab3] were decreased, and that jER1007 was increased in this connection. The glass transition temperature did not decline, but the toughness was greatly enhanced, while the Charpy impact value of the tubular body of the composite material and the Gic of the flat plate of the composite material were enhanced.

Working Example 28

An epoxy resin composition was prepared likewise as in Working Example 27, except that jER1007 of [Ab3] was decreased and that YX4000 of [Aa] was increased. The heat resistance was enhanced but the toughness declined. The phase-separated structure was kept good, and the Charpy impact value was also good.

Working Example 29

An epoxy resin composition was prepared likewise as in Working Example 27, except that jER1004AF of [Ab3] was substituted by Epiclon 830. The viscosity declined, and the heat resistance and elastic modulus were enhanced. Tough the toughness was also high, the phase-separated structure became rather coarse. The Charpy impact value and Glc were at levels of no problem.

Working Example 30

An epoxy resin composition was prepared likewise as in Working Example 26, except that the block copolymer [C] was increased. The elastic modulus rather declined, but the deflection and toughness were slightly enhanced. The phase-separated structure remained equivalent. Owing to the effects of enhanced elongation (deflection) and toughness, the Charpy impact value and Glc were enhanced.

Working Example 31

An epoxy resin composition was prepared likewise as in Working Example 27, except that YD128 of [Ab2] was decreased and that GAN was increased. The viscosity declined, and the elastic modulus was slightly enhanced. The Charpy impact value and Glc were good.

Working Example 32

An epoxy resin composition was prepared likewise as in Working Example 27, except that GAN of [Ab1'] was decreased and that YD128 was increased. The viscosity rose and the elastic modulus declined.
However, the deflection was enhanced. The phase-separated structure became rather coarse, and the Charpy impact value and Gic rather declined but remained at levels of no problem.

Working Example 33

An epoxy resin composition was prepared likewise as in Working Example 31, except that GAN of [Ab1' ] was substituted by GOT. The respective properties did not so greatly changed, and the Charpy impact value and Glc were good.

Working Example 34

An epoxy resin element material was prepared likewise as in Working Example 27, except that jER1004AF of [Ab3] was substituted by YDF2001. The viscosity declined, and the elastic modulus and heat resistance were enhanced. However, the toughness declined, and the phase-separated structure became rather coarse. Accordingly the Charpy impact value and Glc declined but remained at levels of no problem.

Working Example 35

An epoxy resin composition was prepared likewise as in Working Example 27, except that E40 was used as the block copolymer [C]. The phase separation became rather coarse, and the Charpy impact value and Glc declined but remained at levels of no problem.

Working Example 36

An epoxy resin composition was prepared likewise as in Working Example 34, except that YD128 of [Ab2] was decreased and that YDF2001 and GAN were increased. Further, the block copolymer [C] was increased. The respective properties were good, and the phase-separated structure was also controlled to be fine. As result, the Charpy impact value and Glc were also enhanced.

Reference Working Example 1

A thermosetting resin composition was prepared likewise as in Working Example 3, except that the mixed amount of XAC4151 was increased to 90 parts by mass and that the mixed amount of MY0500 was changed in this connection. The viscosity of the resin was too high, and it was difficult to mold the resin sheet.

Reference Working Example 2

A thermosetting resin composition was prepared likewise as in Working Example 3, except that the mixed amount of XAC4151 was decreased to 20 parts by mass and that the mixed amount of YD128 was changed in this connection. The heat resistance declined, and the toughness of the resin also declined. As a result, the open hole compressive strength as a composite property declined.

Reference Working Example 3

A thermosetting resin composition was prepared likewise as in Working Example 3, except that the mixed amount of XAC4151 was changed to 40 parts by mass, that the mixed amount of MY0500 was changed to 10 parts by mass and that the mixed amount of YD128 was changed. Both the bending modulus of elasticity of the resin and the toughness of the resin declined. As a result, the mechanical properties of the composite greatly declined to be insufficient.

Reference Working Example 4

A thermosetting resin composition was prepared likewise as in Working Example 3, except that the mixed amount of XAC4151 was changed to 10 parts by mass and that the mixed amount of MY0500 was changed to 70 parts by mass. The cured resin became rather coarse in phase separation, and the toughness of the resin declined. As a result, the compressive strength after impact as a composite property declined.

Reference Working Example 5

A thermosetting resin composition was prepared likewise as in Working Example 3, except that 50 parts by mass of YD128 were mixed instead of mixing ELM434. Both the bending modulus of elasticity of the resin and the toughness of the resin declined. As a result, the mechanical properties of the composite greatly declined to be insufficient.

Reference Working Example 6

A thermosetting resin composition was prepared likewise as in Working Example 3, except that 50 parts by mass of MY0500 and 50 parts by mass of YD128 were mixed instead of mixing XAC4151. The toughness of the resin declined. As a result, the compressive strength after impact as a composite property declined.

Reference Working Example 7

The composition described in Patent Document 4 was used. The curing agent used as the component [B] was 3,3'-diaminodiphenylsulfone. Both the bending modulus elasticity and heat resistance of the resin were lower than those of Working Examples 1 to 22.

Reference Working Example 8

The same epoxy resin composition as that of Working Example 25 except that YX4000 as the component [Aa] was substituted by a bisphenol F type epoxy (YDF2001), was used. The handling property (viscosity) of the epoxy resin composition was not so different from that of Working Example 25. The heat resistance greatly declined compared with that of Working Example 25. Further, the phase-separated structure became coarse, and accordingly the Gic and Charpy impact strength of the fiber-reinforced composite material greatly declined.

Reference Working Example 9

The same epoxy resin composition as that of Working Example 25 except that diglycidylaniline (GAN) as the component [Ab1] and YD128 as the component [Ab2] were substituted by Epiclon 830 as the component [Ab2], was used. The handling property (viscosity) of the epoxy resin composition was not so different from that of Working Example 25. The heat resistance declined compared with that of Working Example 25. Further, phase separation became coarse, and accordingly the Gic and Charpy impact value of the fiber-reinforced composite material greatly declined.

Reference Working Example 10

The same composition as that of Working Example 25 except that jER1007 of the component [Ab3] was substituted by YD128 as the component [Ab2], was used. The heat resistance was enhanced compared with that of Working Example 25, but the phase-separated structure became coarse. The Gic and Charpy impact value of the fiber-reinforced composite material greatly declined.

Reference Working Example 11

The same composition as that of Working Example 25, except that the block copolymer as the component [C] was not added, was used. No phase-separated structure was obtained, and the effect of enhancing the toughness by the block copolymer was not available. Only low values could be obtained as the Glc and Charpy impact value of the fiber-reinforced composite material.

Reference Working Example 12

The composition described in Patent Document 7 was used. The phase-separated structure was controlled to about 50 nm, but the Glc and Charpy impact value of the fiber-reinforced composite material greatly declined.

Reference Working Example 13

The composition described in Patent Document 5 was used. The phase-separated structure became coarse, and the Gic and Charpy impact value of the fiber-reinforced composite material greatly declined.

TABLE 1

| | Epoxy resin composition (parts by mass) | Working Example 1 | Working Example 2 | Working Example 3 | Working Example 4 | Working Example 5 | Working Example 6 | Working Example 7 | Working Example 8 |
|---|---|---|---|---|---|---|---|---|---|
| [Aa] | XAC4151 | 50 | 50 | 50 | 50 | 50 | | 50 | 30 |
| | AER4152 | | | | | | 50 | | |
| [Ab1] | MY0500 | 30 | 30 | 30 | 30 | 30 | 30 | | |
| | ELM120 | | | | | | | | |
| | ELM434 | | | | | | | 30 | 40 |
| [Ab2] | YD128 | 20 | 20 | 20 | 20 | 20 | 20 | 20 | 30 |
| | Epichlon 830 | | | | | | | | |

TABLE 1-continued

| Epoxy resin composition (parts by mass) | | Working Example 1 | Working Example 2 | Working Example 3 | Working Example 4 | Working Example 5 | Working Example 6 | Working Example 7 | Working Example 8 |
|---|---|---|---|---|---|---|---|---|---|
| [B] | 4,4'-DDS | 1 eq. | 1 eq. | 1 eq. | 1 eq. | 1 eq. | 1 eq. | 1 eq. | 1 eq. |
|  | 3,3'-DDS |  |  |  |  |  |  |  |  |
| [C] | E20 | 4 |  |  |  |  |  |  |  |
|  | M22 |  | 4 |  |  |  |  |  |  |
|  | M22N |  |  | 4 | 1.5 | 8 | 4 | 4 | 4 |
| Resin properties | Glass transition temperature (° C.) | 195 | 197 | 198 | 198 | 187 | 195 | 205 | 199 |
|  | Bending modulus of elasticity (GPa) | 3.8 | 3.8 | 3.8 | 4.0 | 3.6 | 3.9 | 3.8 | 3.8 |
|  | Deflection in bending (mm) | 10 | 10 | 12 | 9 | 14 | 13 | 11 | 10 |
|  | Toughness (K1c) | 1.1 | 1.1 | 1.4 | 1.1 | 1.5 | 1.3 | 1.4 | 1.2 |
|  | Fineness of phase-separated structure (nm) | 800 | 550 | 50 | 30 | 70 | 40 | 25 | 110 |
| Composite properties | Compressive strength after impact (MPa) | 348 | 341 | 367 | 352 | 373 | 365 | 369 | 355 |
|  | Perforated sheet compressive strength (MPa) | 303 | 298 | 305 | 309 | 287 | 302 | 301 | 300 |

TABLE 2

| Epoxy resin composition (parts by mass) | | Working Example 9 | Working Example 10 | Working Example 11 | Working Example 12 | Working Example 13 | Working Example 14 | Working Example 15 | Working Example 16 |
|---|---|---|---|---|---|---|---|---|---|
| [Aa] | XAC4151 | 50 | 30 | 30 | 70 | 50 | 30 |  |  |
|  | Modification product of novolak type isocyanate |  |  |  |  |  |  | 50 |  |
|  | Modification product of bisphenol F type isocyanate |  |  |  |  |  |  |  | 50 |
|  | HP4032D |  |  |  |  |  |  |  | 20 |
| [Ab1] | MY0500 | 20 | 50 | 30 | 20 | 30 |  | 30 |  |
|  | ELM120 |  |  |  |  |  |  |  | 30 |
|  | ELM434 |  |  |  |  |  | 40 |  |  |
| [Ab2] | YD128 | 30 | 20 | 40 | 10 | 20 | 30 | 20 |  |
|  | Epichlon 830 |  |  |  |  |  |  |  |  |
| [B] | 4,4'-DDS | 1 eq. | 1 eq. | 1 eq. | 1 eq. |  |  |  | 1 eq. |
|  | 3,3'-DDS |  |  |  |  | 1 eq. | 1 eq. | 1 eq. |  |
| [C] | M22N | 4 | 4 | 4 | 4 | 4 | 4 | 4 | 4 |
| Resin properties | Glass transition temperature CC) | 191 | 218 | 205 | 203 | 182 | 180 | 195 | 196 |
|  | Bending modulus of elasticity (GPa) | 3.6 | 4.0 | 3.8 | 3.6 | 4.3 | 4.4 | 4.3 | 3.9 |
|  | Deflection in bending (mm) | 9 | 11 | 13 | 13 | 13 | 11 | 8 | 9 |
|  | Toughness (K1c) | 1.3 | 1 | 1.3 | 1.4 | 1.8 | 1.7 | 1.5 | 1.3 |
|  | Fineness of phase-separated structure (nm) | 40 | 520 | 20 | 60 | 40 | 60 | 50 | 180 |
| Composite properties | Compressive strength after impact (MPa) | 358 | 354 | 368 | 360 | 378 | 375 | 364 | 358 |
|  | Perforated sheet compressive strength (MPa) | 295 | 307 | 301 | 290 | 329 | 330 | 325 | 303 |

TABLE 3

| Epoxy resin composition (parts by mass) | | Working Example 17 | Working Example 18 | Working Example 19 | Working Example 20 | Working Example 21 | Working Example 22 | Working Example 23 | Working Example 24 |
|---|---|---|---|---|---|---|---|---|---|
| [Aa] | HP4700 | 50 |  |  |  |  |  |  |  |
|  | HP4770 |  | 40 |  |  |  |  |  |  |
|  | NC 7300 |  |  | 50 |  |  |  |  |  |
|  | YX4000H |  |  |  | 50 |  |  |  |  |
|  | HP7200 |  |  |  |  | 50 |  | 30 |  |
|  | EX-1010 |  |  |  |  |  | 50 |  |  |
|  | Modification product of bisphenol A type polyisocyanate |  |  |  |  |  |  |  | 50 |
| [Ab1] | MY0500 |  |  | 30 | 30 | 30 | 30 | 30 | 30 |
|  | ELM120 | 30 |  |  |  |  |  |  |  |
|  | ELM434 |  |  |  |  |  |  | 40 |  |
|  | GOT |  |  |  |  |  |  | 30 |  |
| [Ab2] | YD128 |  |  | 20 | 20 |  | 20 | 20 | 20 |
|  | Epichlon 830 |  | 20 |  |  |  |  |  |  |
| Other epoxy resins | jER152 |  | 10 |  | 20 |  |  |  |  |
|  | EPPN-501H |  |  |  |  | 10 |  |  |  |
| [B] | 4,4'-DDS | 1 eq. |  | 1 eq. | 1 eq. | 1 eq. | 1 eq. | 0.9 eq. |  |
|  | 3,3'-DDS |  | 1 eq. |  |  |  |  |  | 1 eq. |
| [C] | M22N | 4 | 4 | 4 | 4 | 4 | 4 | 4 | 4 |
| Resin properties | Glass transition temperature (° C.) | 230 | 190 | 216 | 208 | 212 | 220 | 180 | 190 |
|  | Bending modulus of elasticity (GPa) | 3.9 | 4.4 | 4.0 | 3.6 | 3.7 | 3.8 | 4.2 | 4.2 |
|  | Deflection in bending (mm) | 8 | 7 | 8 | 7 | 9 | 9 | 7 | 7 |

TABLE 3-continued

|  |  | Working Example 17 | Working Example 18 | Working Example 19 | Working Example 20 | Working Example 21 | Working Example 22 | Working Example 23 | Working Example 24 |
|---|---|---|---|---|---|---|---|---|---|
|  | Epoxy resin composition (parts by mass) |  |  |  |  |  |  |  |  |
|  | Toughness (K1c) | 1.1 | 1.4 | 1.2 | 1.1 | 1.2 | 1.2 | 1.1 | 1.3 |
|  | Fineness of phase-separated structure (nm) | 95 | 85 | 55 | 50 | 20 | 30 | 100 | 40 |
| Composite properties | Compressive strength after impact (MPa) | 345 | 370 | 345 | 337 | 350 | 353 | 347 | 360 |
|  | Perforated sheet compressive strength (MPa) | 304 | 328 | 308 | 291 | 295 | 301 | 315 | 320 |

TABLE 4

|  | Epoxy resin composition (parts by mass) | Working Example 25 | Working Example 26 | Working Example 27 | Working Example 28 | Working Example 29 | Working Example 30 |
|---|---|---|---|---|---|---|---|
| [Aa] | YX4000 | 35 | 35 | 30 | 35 | 30 | 35 |
| [Ab1] | GAN | 15 | 15 | 15 | 15 | 15 | 15 |
|  | GOT |  |  |  |  |  |  |
| [Ab2] | YD128, | 15 | 15 | 15 | 15 | 15 | 15 |
|  | Epichlon 830 |  |  |  |  | 10 |  |
| [Ab3] | jER1004AF | 14 | 35 | 10 | 10 |  | 35 |
|  | jER1007 | 21 |  | 30 | 25 | 30 |  |
|  | YDF2001 |  |  |  |  |  |  |
| [B] | Dicyandiamide | 3.97 | 4.08 | 3.71 | 3.95 | 4.17 | 4.08 |
| [C] | E40 |  |  |  |  |  |  |
|  | M22N | 4.4 | 4.4 | 4.4 | 4.4 | 4.4 | 5 |
| Curing accelerator | DCMU | 1.7 | 1.7 | 1.7 | 1.7 | 1.7 | 1.7 |
| Resin properties | Viscosity (Pa · s @80° C.) | 27 | 19 | 44 | 37 | 16 | 29 |
|  | Glass transition temperature (° C.) | 127 | 130 | 120 | 125 | 128 | 129 |
|  | Bending modulus of elasticity (GPa) | 3.4 | 3.44 | 3.39 | 3.39 | 3.48 | 3.3 |
|  | Deflection in bending (mm) | 10.5 | 9.9 | 13.3 | 12.2 | 12.9 | 10.6 |
|  | Toughness (K1c) | 1.7 | 1.62 | 1.92 | 1.75 | 1.8 | 1.7 |
|  | Rneness of phase-separated structure (nm) | 10 | 20 | 10 | 10 | 30 | 20 |
| Composite properties | Charpy impact (tubular body Jim) | 735 | 702 | 780 | 729 | 709 | 730 |
|  | Gic (Jim) | 754 | 720 | 804 | 735 | 725 | 760 |
|  | 90° C. bending strength (MPa) | 115 | 119 | 117 | 110 | 126 | 125 |

TABLE 5

|  | Epoxy resin composition (parts by mass) | Working Example 31 | Working Example 32 | Working Example 33 | Working Example 34 | Working Example 35 | Working Example 36 |
|---|---|---|---|---|---|---|---|
| [Aa] | YX4000 | 30 | 30 | 30 | 30 | 30 | 30 |
| [Ab1] | GAN | 20 | 10 |  | 15 | 15 | 20 |
|  | GOT |  |  | 20 |  |  |  |
| [Ab2] | YD128 | 10 | 20 | 10 | 15 | 15 | 5 |
|  | Epichlon 830 |  |  |  |  |  |  |
| [Ab3] | jER1004AF | 10 | 10 | 10 |  | 10 |  |
|  | jER1007 | 30 | 30 | 30 | 30 | 30 | 30 |
|  | YDF2001 |  |  |  | 10 |  | 15 |
| [B] | Dicyandiamide | 3.84 | 3.58 | 3.73 | 3.81 | 3.71 | 3.79 |
| [C] | E40 |  |  |  |  | 4.4 |  |
|  | M22N | 4.4 | 4.4 | 4.4 | 4.4 |  | 5 |
| Curing accelerator | DCMU | 1.7 | 1.7 | 1.7 | 1.7 | 1.7 | 2 |
| Resin properties | Viscosity (Pa · s @80° C.) | 32 | 48 | 27 | 36 | 44 | 45 |
|  | Glass transition temperature (° C.) | 122 | 122 | 122 | 125 | 117 | 125 |
|  | Bending modulus of elasticity (GPa) | 122 | 3.36 | 3.41 | 3.45 | 3.29 | 3.44 |
|  | Deflection in bending (mm) | 11.6 | 14.1 | 11.9 | 10.4 | 10.9 | 13.3 |
|  | Toughness (K1c) | 1.88 | 1.78 | 1.84 | 1.75 | 1.9 | 2.01 |
|  | Fineness of phase-separated structure (nm) | 10 | 20 | 10 | 20 | 30 | 10 |
| Composite properties | Charpy impact (tubular body Jim) | 774 | 744 | 769 | 714 | 710 | 811 |
|  | Gic (Jim)$^2$ | 796 | 752 | 793 | 736 | 733 | 849 |
|  | 90° C. bending strength (MPa) | 111 | 109 | 112 | 121 | 115 | 122 |

TABLE 6

|  | Epoxy resin composition (parts by mass) | Reference Working Example 1 | Reference Working Example 2 | Reference Working Example 3 | Reference Working Example 4 | Reference Working Example 5 | Reference Working Example 6 | Reference Working Example 7 |
|---|---|---|---|---|---|---|---|---|
| [Aa] | XAC4151 | 90 | 20 | 40 | 10 | 50 |  |  |
|  | YX4000H |  |  |  |  |  |  | 50 |
| [Ab1] | MY0500 | 10 | 30 | 10 | 70 |  | 50 |  |

TABLE 6-continued

|  | Epoxy resin composition (parts by mass) | Reference Working Example 1 | Reference Working Example 2 | Reference Working Example 3 | Reference Working Example 4 | Reference Working Example 5 | Reference Working Example 6 | Reference Working Example 7 |
|---|---|---|---|---|---|---|---|---|
| [Ab2] | YD128 | 20 | 50 | 50 | 20 | 50 | 50 | |
|  | Epichlon 830 | | | | | | | 50 |
| [B] | 4,4'-DDS | 1eq. | 1eq. | 1eq. | 1eq. | 1 eq. | 1eq. | |
|  | 3,3'-DDS | | | | | | | 1eq. |
| [C] | E40F | | | | | | | |
|  | M22 | | | | | | | 7.5 |
|  | M22N | 4 | 4 | 4 | 4 | 4 | 4 | |
| Resin properties | Glass transition temperature (° C.) | — | 160 | 170 | 185 | 180 | 185 | 152 |
|  | Bending modulus of elasticity (GPa) | — | 3.6 | 3.6 | 3.8 | 3.3 | 3.6 | 3.2 |
|  | Deflection in bending (mm) | — | 6 | 6 | 4 | 7 | 6 | 8.2 |
|  | Toughness (K1c) | — | 0.9 | 0.6 | 0.5 | 0.6 | 0.5 | 1.8 |
|  | Fineness of phase-separated structure (nm) | — | 40 | 70 | 1200 | 80 | 50 | 45 |
| Composite properties | Compressive strength after impact (MPa) | — | 335 | 284 | 257 | 276 | 241 | |
|  | Perforated sheet compressive strength (MPa) | — | 247 | 258 | 297 | 265 | 254 | |

TABLE 7

|  | Epoxy resin composition (parts by mass) | Reference Working Example 8 | Reference Working Example 9 | Reference Working Example 10 | Reference Working Example 11 | Reference Working Example 12 | Reference Working Example 13 |
|---|---|---|---|---|---|---|---|
| [Aa] | YX4000 | | 35 | 35 | 35 | | |
|  | HP7200L | | | | | | 30 |
| [Ab1] | GAN | 15 | | 15 | 15 | | |
|  | ELM100 | | | | | 30 | |
| [Ab2] | YD128 | 15 | | 36 | 15 | | |
|  | Epichlon 830 | | 30 | 15 | | | |
|  | jER828 | | | | | | 70 |
| [Ab3] | jER1004AF | 14 | 14 | 14 | 14 | 10 | |
|  | jER1007 | 21 | 21 | | 21 | | |
|  | YDF2001 | 35 | | | | 50 | |
|  | jER4004P | | | | | 10 | |
| [B] | Dicyandiamide | 2.87 | 3.75 | 4.93 | 3.97 | 3.9 | 5.5 |
| [C] | E40F | | | | | | 3 |
|  | M22N | 4.4 | 4.4 | 4.4 | | 4 | |
| Curing accelerator | DCMU | 1.7 | 1.7 | 1.7 | 1.7 | 2 | 3 |
| Other component | Vinylek K | | | | | | 3 |
| Resin properties | Viscosity (Pa-s @80° C.) | 41 | 54 | 7 | 18 | 36 | |
|  | Glass transition temperature (° C.) | 102 | 118 | 133 | 127 | 120 | 135 |
|  | Fineness of phase-separated structure (nm) | 200 | >500 | >500 | — | 50 | >500 |
| Composite properties | Charpy impact (tubular body J/m²) | 587 | 574 | 529 | 471 | 601 | 520 |
|  | Gic (J/m) | 614 | 630 | 547 | 422 | 633 | 539 |
|  | 90° C. bending strength (MPa) | 107 | 109 | 115 | 116 | 119 | 106 |

Industrial Applicability

The epoxy resin composition of this invention can be processed into a cured product having sufficiently high toughness, heat resistance and elastic modulus, and therefore if it is combined with reinforcing fibers, a fiber-reinforced composite material excellent in impact resistance, heat resistance and static strength properties can be obtained. This allows fibers with a high elastic modulus to be used for the applications and regions in which the use of the conventional products has been difficult, and it is expected that further reduction in weight of fiber-reinforced composite materials can be promoted in respective fields.

The invention claimed is:

1. An epoxy resin composition comprising an epoxy resin [A], an amine-based curing agent [B] and a block copolymer [C] as components, wherein the epoxy resin [A] contains [Aa] and [Ab] as defined below, the amine-based curing agent [B] is diaminodiphenylsulfone, and the block copolymer [C] is defined below:

[Aa] is an epoxy resin having at least one structure selected from a condensed polycyclic structure and oxazolidone ring structure, wherein the condensed polycyclic structure is at least one structure selected from a naphthalene structure, and fluorene structure;

[Ab] is a polyfunctional amine epoxy resin [Ab1] and a liquid bisphenol epoxy resin [Ab2];

[C] is at least one block copolymer selected from the group consisting of S-B-M, B-M and M-B-M; wherein the aforementioned respective blocks are linked by a covalent bond or are linked by an intermediate molecule connected with one block by one covalent bond and with the other block by another covalent bond;

block M is a block consisting of a copolymer containing at least 50 wt % of methyl methacrylate and a comonomer with an SP value higher than that of methyl methacrylate;

block B is a block immiscible with the block M and has a glass transition temperature of 20° C. or lower; and block S is a block immiscible with the blocks B and M and has a glass transition temperature higher than the glass transition temperature of the block B; and wherein epoxy resin [A] contains 30 to 70 mass % of component [Aa], 25 to 50 mass % of component [Ab1] and 10 to 40 mass % of component [Ab2], based on 100 mass % of epoxy resin [A], and the block copolymer [C] is present in an amount of 1 to 10 parts by mass per 100 parts by mass of epoxy resin [A].

2. An epoxy resin composition, according to claim 1, wherein the component [Aa] is an epoxy resin having an oxazolidone ring structure or naphthalene structure.

3. An epoxy resin composition, according to claim 1, wherein the component [A] is an epoxy having an epoxy equivalent in a range from 300 to 500 and having an oxazolidone ring structure, and the amount of active hydrogen of the component [B] is 0.6 to 1.2 times the amount of the epoxy groups in the component [A].

4. A cured epoxy resin obtained by curing the epoxy resin composition set forth in claim 1, wherein the bending modulus of elasticity is 3.6 GPa or more and the glass transition temperature is 180° C. or higher.

5. An epoxy resin composition, according to claim 1, wherein the component [C] is a block copolymer represented by M-B-M.

6. A prepreg having reinforcing fibers impregnated with the epoxy resin composition set forth in claim 1.

7. A fiber-reinforced composite material containing a cured product obtained by curing the epoxy resin composition set forth in claim 1 and a reinforcing fiber base.

\* \* \* \* \*